(12) United States Patent
Levy

(10) Patent No.: US 7,500,659 B2
(45) Date of Patent: Mar. 10, 2009

(54) AIR SPRING ASSEMBLY AND METHOD

(75) Inventor: Daniel I. Levy, High Beech (GB)

(73) Assignee: BFS Diversified Products, LLC, Indianapolis, IN (US)

( * ) Notice: Subject to any disclaimer, the term of this patent is extended or adjusted under 35 U.S.C. 154(b) by 0 days.

(21) Appl. No.: 11/398,835

(22) Filed: Apr. 6, 2006

(65) Prior Publication Data
US 2006/0226586 A1    Oct. 12, 2006

Related U.S. Application Data

(60) Provisional application No. 60/669,715, filed on Apr. 7, 2005.

(51) Int. Cl.
*F16F 9/04* (2006.01)
(52) U.S. Cl. .............. 267/64.27; 267/64.21; 267/64.24
(58) Field of Classification Search .............. 267/64.27, 267/64.21, 64.24
See application file for complete search history.

(56) References Cited

U.S. PATENT DOCUMENTS

| | | | | |
|---|---|---|---|---|
| 4,787,606 A * | 11/1988 | Geno et al. | .............. | 267/64.27 |
| 4,890,823 A * | 1/1990 | Koschinat et al. | ........ | 267/64.27 |
| 5,060,916 A | 10/1991 | Koschinat et al. | | |
| 5,180,146 A * | 1/1993 | Schneider et al. | ........ | 267/64.27 |
| 5,535,994 A * | 7/1996 | Safreed, Jr. | .............. | 267/64.27 |
| 6,024,343 A * | 2/2000 | Ebert | ...................... | 267/64.27 |
| 6,109,598 A * | 8/2000 | Hilburger et al. | ........ | 267/64.24 |
| 6,113,081 A * | 9/2000 | Hilburger et al. | ........ | 267/64.27 |
| 6,386,524 B1 * | 5/2002 | Levy et al. | .............. | 267/64.27 |
| 6,527,259 B1 * | 3/2003 | Nemeth et al. | ........... | 267/64.21 |
| 6,942,201 B2 * | 9/2005 | Leonard | .................. | 267/64.27 |
| 7,226,045 B2 * | 6/2007 | Brookes | .................. | 267/64.27 |

(Continued)

FOREIGN PATENT DOCUMENTS

DE    295 10 199 U 1    10/1995

(Continued)

OTHER PUBLICATIONS

ContiTech Luftfedersysteme GmbH, Hannover, Germany, webpage printout showing rolling lobe air springs (725 N P03), 1 page dated Apr. 6, 2006.

(Continued)

*Primary Examiner*—Robert A Siconolfi
*Assistant Examiner*—James K Hsiao
(74) *Attorney, Agent, or Firm*—Sarah M. Jabbari; Fay, Sharpe, LLC

(57) ABSTRACT

A piston assembly for an air spring includes an outer shell and a structural insert. The outer shell includes a side wall and an end wall at least partially defining a shell cavity having an open end. The structural insert is received in the shell cavity and includes a central portion and a plurality of support walls extending outwardly from the central portion toward the side wall of the outer shell. The central portion includes first and second opposing ends with the first end disposed toward the end wall of the outer shell and the second end disposed toward the open end of the outer shell. An air spring assembly includes such a piston assembly. A method of manufacturing an air spring assembly is also included.

15 Claims, 22 Drawing Sheets

U.S. PATENT DOCUMENTS 7,270,317 B2 * 9/2007 Leonard .................. 267/64.27
2005/0236748 A1 * 10/2005 Gross et al. .............. 267/64.27

FOREIGN PATENT DOCUMENTS

DE      298 08 109 U 1      8/1998
DE      201 01 576 U 1      7/2002

OTHER PUBLICATIONS

ContiTech Luftfedersysteme GmbH, Hannover, Germany, webpage printout showing rolling lobe air springs (725 N P02) 1 page dated Apr. 6, 2006.

* cited by examiner

AIR SPRING ASSEMBLY AND METHOD

This application claims priority from U.S. Provisional Patent Application No. 60/669,715 filed on Apr. 7, 2005, which is hereby incorporated herein by reference in its entirety.

BACKGROUND

The present novel concept broadly relates to fluid suspension systems and, more particularly, to an air spring assembly having an improved piston construction and a method of manufacturing the same.

It is to be specifically understood that the subject novel concept is capable of broad use in a wide variety of suitable applications and environments and can be used in association with air spring assemblies of any suitable size, type and/or configuration without departing from the principles thereof.

One category of known air spring assemblies, referred to in the art as rolling lobe-type air springs, typically includes a top plate, a piston and a flexible sleeve secured therebetween. The flexible sleeve forms a lobe that rolls up and down an outer side wall of the piston in response to loads applied to the top plate and/or piston. In such assemblies, the piston is normally formed from either a metal material, typically steel, or a plastic material. Each construction has numerous benefits as well as some disadvantages, and the selection of one construction versus the other will vary from application-to-application.

One benefit of producing a piston from plastic is that the piston can often be injection molded as a complete or nearly complete component. As a result, costs associated with physically assembling the piston can be significantly reduced or eliminated. Additionally, it is well understood that air springs are commonly exposed to harsh environments, such as in vehicle suspension applications in which water, dirt, salt and other materials are present. Another benefit is that pistons formed from a plastic material are often less susceptible to exposure of this kind.

There are, however, numerous disadvantages associated with manufacturing a piston from a plastic material. One disadvantage is that air spring piston applications typically require high performance plastic materials. These types of specialty plastics provide advanced material properties (e.g., high strength, high impact resistance, low water absorption, UV resistance) over common commodity grade plastics. Accordingly, specialty plastics are normally considerably more expensive than common commodity grades. For smaller sized pistons, significant cost savings can be achieved by molding a plastic piston as a complete part and eliminating any associated assembly costs. However, as the size of the piston increases, the quantity of material used to form the piston likewise increases, in many cases at greater than a 1:1 ratio. Therefore, the cost associated with the manufacture of larger pistons can significantly increase due, at least in part, to the increased expenses of the additional quantity of the plastic material. Thus, in some cases, particularly in the case of bigger sizes, the assembly cost savings can be largely offset by the increased material costs. As such, at some point it becomes less expensive to use metal and incur the associated assembly costs.

Another disadvantage of manufacturing pistons from a plastic material is associated with the method of manufacturing the parts. That is, pistons formed from a plastic material are typically injection molded. The injection molding process imposes certain design constraints on the configuration of the parts being produced. For example, it is generally understood that it is desirable for the wall thicknesses of the molded part to be substantially uniform. This can help to minimize undesirable part shrinkage and can also assist in promoting material flow into the mold cavity. In practice, this is a real constraint that limits the options available in designing the part or component.

Another example of a design constraint attendant to the injection molding process is due to the action of retracting a portion of the mold to eject the finished part. It is well understood that the mold halves that make up a mold cavity are pulled apart so that the molded part, once cured, can be removed or ejected. For this action to be completed without damaging the part, there must be no parts of the mold tooling embedded in or otherwise interengaging the plastic part. Otherwise, this piece of the mold tooling will either damage the part when the mold halves are separated or prevent the separation thereof altogether. This makes it difficult to mold features into a part that extend lateral to the direction of the mold pull. Thus, this too is a design constraint that limits the options available in designing the part or component. In some cases, secondary operations can be utilized to machine or otherwise produce such features. However, this increases the cost of producing the part and offsets the cost benefit of molding the part complete.

Pistons formed from a metal material, typically steel, are also commonly produced. Like the plastic pistons discussed above, metal pistons have numerous advantages and disadvantages. Some of the significant advantages include the strength properties associated with metals, such as steel, for example. The ultimate strength of steel is considerably greater than the strength of most plastic materials. Additionally, steel and other metals have elastic yield properties that are absent in plastic materials. Thus, a metal piston of an air spring assembly is capable of yielding under a load, whereas a plastic piston might become permanently deflected.

Unfortunately, the significant assembly cost savings associated with molded parts is often not available where a corresponding part is manufactured from metal. This is primarily due to the fact that metal components cannot be manufactured complete in the same manner as molded parts. Rather, numerous metal pieces are often assembled into a completed part. Thus, significant assembly costs are often associated with the manufacture items from metal materials, and these costs are typically considerably higher than the corresponding material costs.

However, metal material costs can also add significantly to the overall production costs of a finished part, such as a piston for an air spring assembly, particularly in known designs that utilize thick materials as well as in comparatively large pistons. Thus, as metal material costs increase, the overall production costs also increase, and these increases can be significant in some cases.

Accordingly, an improved air spring assembly and method have been developed that overcome these and other disadvantages.

BRIEF DESCRIPTION

An air spring piston assembly in accordance with one embodiment of the present novel concept is provided and includes an outer shell and a structural insert. The outer shell includes a side wall and an end wall at least partially defining a shell cavity having an open end. The structural insert is received in the shell cavity and includes a central support section and a plurality of support walls extending outwardly from the central support section toward the side wall of the outer shell. The central support section includes opposing first and second ends with the first end disposed toward the end wall of the outer shell and the second end disposed toward the open end of the shell cavity.

An air spring assembly in accordance with the present novel concept is provided and includes a first end member, a second end member in spaced relation to the first end member, and a flexible wall secured on the first and second end members. The flexible wall at least partially forms a spring chamber between the first and second end members. The second end member includes an outer shell and a support structure insert. The outer shell includes a side wall and an end wall forming a shell cavity having an open end opposite the end wall. The support structure insert includes a central support portion extending from the end wall toward the open end and at least one support wall extending outwardly from the central support portion toward the side wall of the outer shell.

An air spring assembly in accordance with the present novel concept, for an associated vehicle suspension having spaced first and second structural members, is provided and includes a first end member adapted to engage the first structural member and a first securement member operatively associated with the first end member for securing the first end member along the first structural member. A piston assembly is adapted to engage the second structural member and includes an outer shell and a structural insert. A second securement member is operatively associated with the piston assembly for securing the piston assembly along the second structural member. A flexible sleeve secured between the first end member and the piston assembly, and at least partially forms a spring chamber therebetween. The outer shell includes a shell side wall and a shell end wall integrally formed of thin-walled metal material. The shell side wall and shell end wall form a shell cavity having an open end opposite the shell end wall. The structural insert is received in the shell cavity and includes a first insert end wall in abutting engagement with the shell end wall. A second insert end wall is disposed toward the open end of the outer shell. A plurality of support walls extends outwardly toward the shell side wall.

A method of manufacturing an air spring piston assembly in accordance with the present novel concept is provided and includes forming an outer shell that includes a side wall and an end wall that at least partially define a shell cavity having an open end. The method also includes forming a structural insert that includes a central support section and a support wall that extends outwardly from the central support section. The method further includes inserting the structural insert at least partially into the shell cavity and securing the structural insert to the outer shell.

A method of manufacturing an air spring assembly in accordance with the present novel concept is provided and includes providing a first end member. The method also includes assembling a piston assembly that includes an outer shell and a structural insert. The outer shell includes a shell side wall and a shell end wall at least partially defining a shell cavity having an open end opposite the shell end wall. The inner support structure includes a central support portion and a plurality of support walls extending outwardly from the central support portion toward the shell side wall. The method also includes providing a flexible sleeve having opposing first and second ends. The method further includes securing the first end of the flexible sleeve on the first end member. The method also includes securing the second end of the flexible sleeve on the piston assembly.

DETAILED DESCRIPTION

Figure 1:
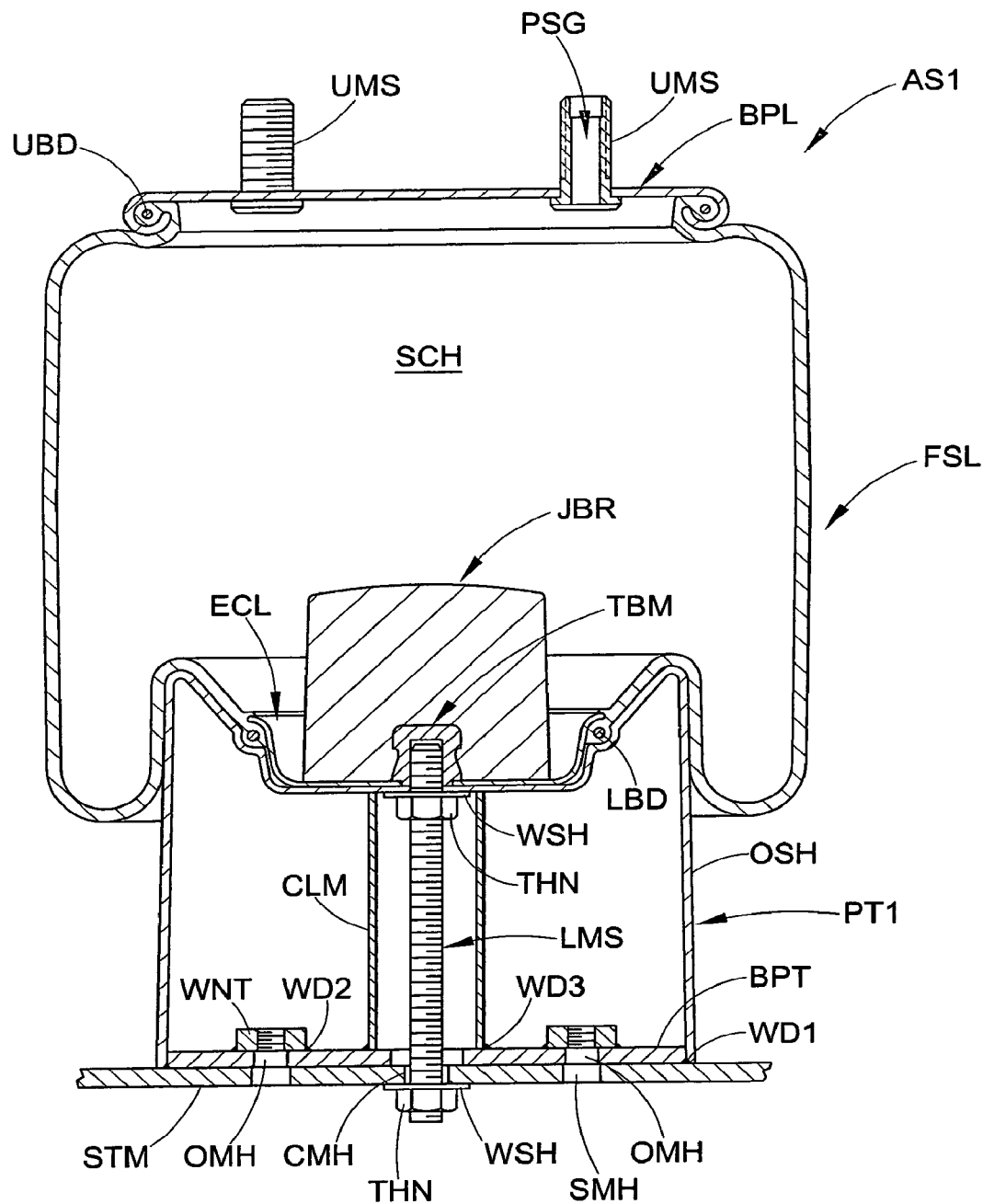
FIG. 1 is a cross-sectional side view of an air spring assembly having a known metal piston.

FIG. 1 illustrates an air spring AS1 of a generally known construction secured along a structural member STM, such as a component of a vehicle, for example. Air spring AS1 includes a top or bead plate BPL and a piston PT1 in spaced relation thereto. A flexible sleeve FSL is secured between the bead plate and piston and generally defines a spring chamber SCH formed therebetween.

Flexible sleeve FSL includes an upper mounting bead UBD that is captured by bead plate BPL in a typical manner, such as by crimping the peripheral edge of the bead plate around the upper mounting bead. Upper mounting studs UMS are supported on bead plate BPL and project outwardly therefrom. An air passage PSG extends through one of the upper mounting studs and is in fluid communication with spring chamber SCH.

Flexible sleeve FSL also includes a lower mounting bead LBD that is secured on piston PT1 using an end closure ECL. A threaded bumper mount TBM receives a lower mounting stud LMS that extends through end closure ECL, piston PT1 and structural member STM. Threaded bumper mount TBM and end closure ECL are secured on the piston by a first washer WSH and threaded nut THN. Additionally, the air spring assembly is secured to structural member STM using a second washer WSH and a second threaded nut THN. As lower mounting stud LMS is tensioned by the first threaded nut, bumper mount TBM secures end closure ECL on piston PT1 thereby capturing and retaining lower mounting bead LBD of flexible sleeve FSL. A jounce bumper JBR is shown as being secured on bumper mount TBM along end closure ECL.

Piston PT1 is exemplary of known steel piston constructions and includes an outer shell OSH along which flexible sleeve FSL is secured and rolls. A base plate BPT is received within a lower, open end of outer shell OSH and is typically secured therein by welding the base plate and outer shell together, as indicated by all-around weld WD1. A central mounting hole CMH extends through base plate BPT and lower mounting stud LMS extends therethrough. Outer mounting holes OMH are spaced radially outwardly from the central mounting hole and are suitable for receiving fasteners (not shown). Weld nuts WNT are secured, such as by welded joints WD2, on base plate BPT adjacent outer mounting holes OMH. Additionally, structural member holes SMH are in alignment with the outer mounting holes and weld nuts for receiving a suitable fastener (not shown). A center column CLM extends between outer shell OSH and base plate BPT and is typically secured on the base plate by a welded joint WD3.

Figure 2:
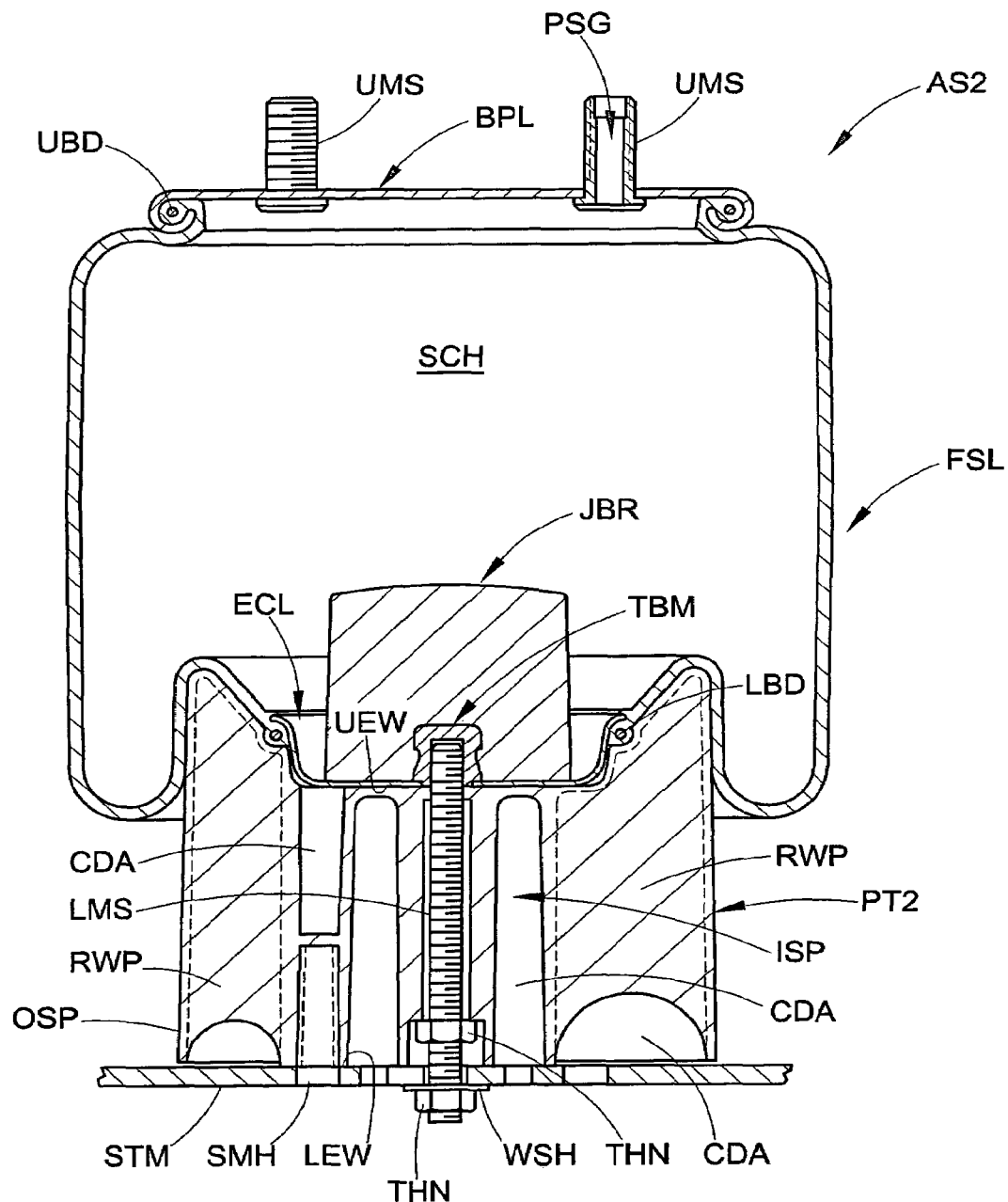
FIG. 2 is a cross-sectional side view of an air spring assembly having a known plastic piston.

Another embodiment of an air spring AS2 of known construction is shown in FIG. 2. It will be appreciated that air spring AS2 is similar to air spring AS1 shown in and described with regard to FIG. 1. As such, like items will be shown and/or described using like reference characters. Additionally, new or modified features and/or components are shown and described using new reference characters.

Air spring AS2 includes a top or bead plate BPL and a piston PT2 spaced from the bead plate. A flexible sleeve FSL is secured between the bead plate and piston PT2 in a typical manner, such as by using a crimped joint and an end closure ECL to respectively capture an upper mounting bead UBD and a lower mounting bead LBD of the flexible sleeve.

The primary difference between air spring AS1 shown in FIG. 1 and air spring AS2 shown in FIG. 2 is that piston PT2 of air spring AS2 is molded from a plastic material. As such, piston PT2 is typically a unitary construction formed from a single material. Piston PT2 includes an outer shell portion OSP and an inner support portion ISP. Outer shell portion OSP is interconnected with inner support portion ISP through a plurality of radial wall portions RWP. Inner support portion ISP extends between an upper end wall UEW and a lower end wall LEW. The upper end wall engages end closure ECL and the lower end wall is supported on a structural member STM.

As piston PT2 is of a molded construction, it will be appreciated that typical molding conventions and techniques apply to the manufacture thereof and are used in forming piston PT2. For example, it is desirable to maintain a substantially uniform wall thickness when an injection molding process is utilized. As such, piston PT2 includes numerous cored areas CDA of a variety of shapes, sizes and configurations. Thus, certain limitations in the shape and/or configuration of piston PT2 and the walls thereof may exist.

Figure 3:
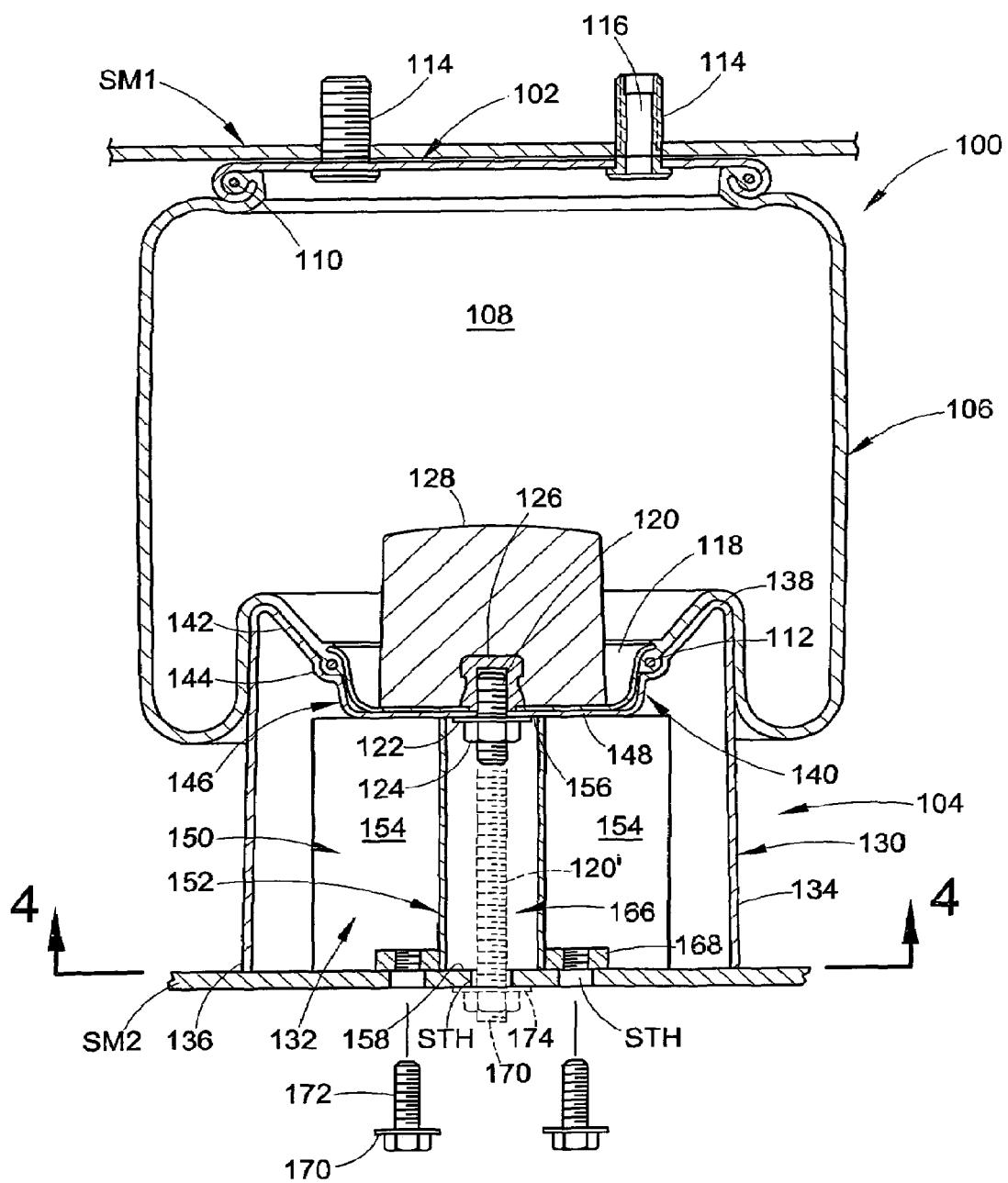
FIG. 3 is a cross-sectional side view of one embodiment of an air spring assembly in accordance with the present novel concept.

Turning now to FIGS. 3-25 wherein the showings are for the purpose of illustrating exemplary embodiments of the present novel concept, and not for the purpose of limiting the same, FIG. 3 illustrates an air spring assembly 100 that includes a first end member, such as top or bead plate 102, for example, and a second end member, such as piston assembly 104, for example, spaced from the first end member. A flexible wall, such as a flexible sleeve 106, for example, is secured between bead plate 102 and piston assembly 104 and at least partially forms a spring chamber 108 therebetween. Flexible sleeve 106 includes an upper mounting bead 110 and a lower mounting bead 112 formed on opposing ends thereof, and can optionally include a reinforcing ring (not numbered) or other suitable component.

Upper mounting bead 110 of the flexible sleeve is captured by the peripheral edge of bead plate 102. The peripheral edge can be deformed around the upper mounting bead in any manner suitable for forming a substantially fluid-tight seal therewith. One or more securement devices, such as mounting studs 114, for example, can be included along bead plate 102. In the exemplary embodiment shown in FIG. 3, mounting studs 114 project outwardly from the bead plate and are secured thereon in a suitable manner. The one or more securement devices are suitable for securing the bead plate on an associated structural member SM1, such as a component of a vehicle, for example. A fluid communication port, such as a fluid passage 116, for example, is provided to permit fluid communication with spring chamber 108. In the exemplary embodiment shown, fluid passage 116 extends through at least one of studs 114 and is in fluid communication with spring chamber 108. However, it will be appreciated that any other suitable fluid communication arrangement could alternately be used.

Lower mounting bead 112 of the flexible sleeve is captured between an end closure 118 and piston assembly 104. The end closure is secured on the piston assembly using a suitable securement device or assembly, such as a mounting stud 120, washer 122 and threaded nut 124, for example. The mounting stud threadably engages a threaded bumper mount 126 that is positioned along end closure 118. A jounce bumper 128 can be received on bumper mount 124 in a suitable manner.

Figure 4:
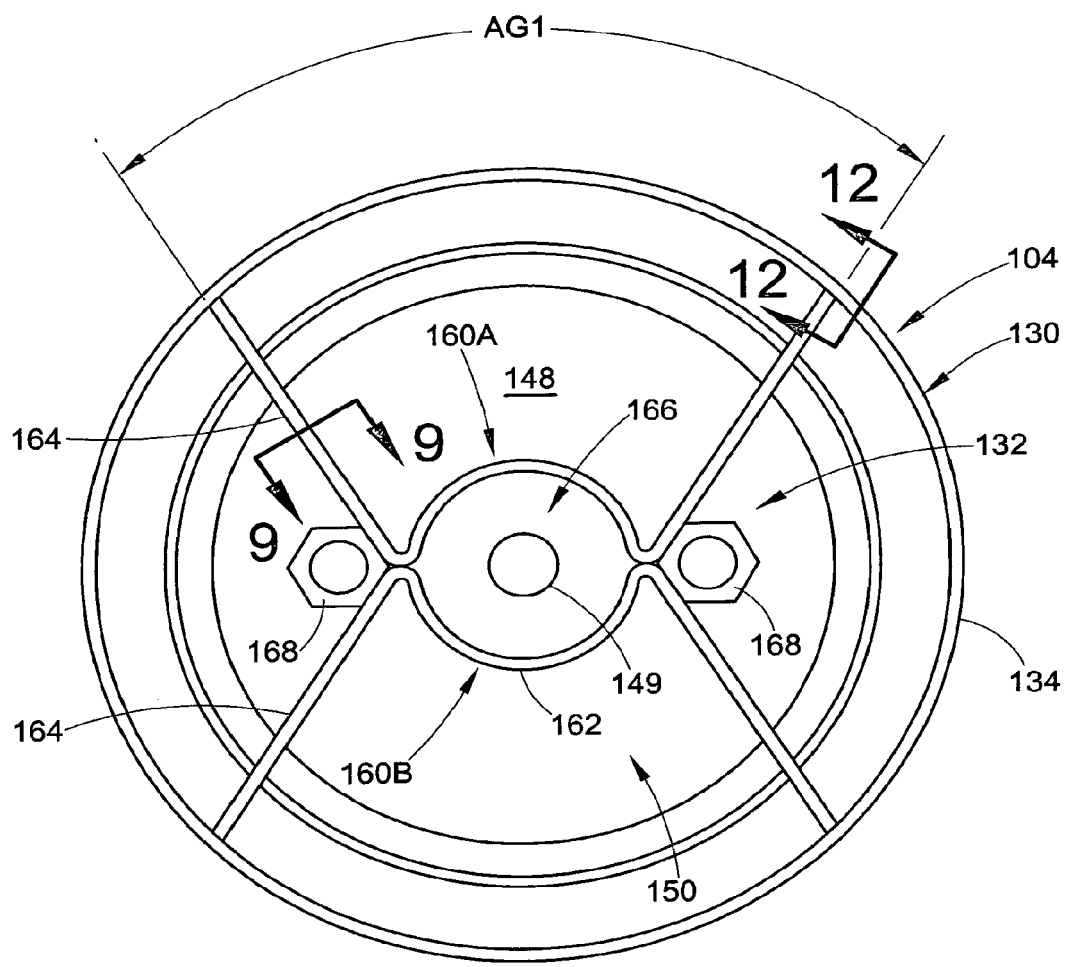
FIG. 4 is a cross-sectional plan view of the piston assembly in FIG. 3 taken along line 4-4.
Figure 5:
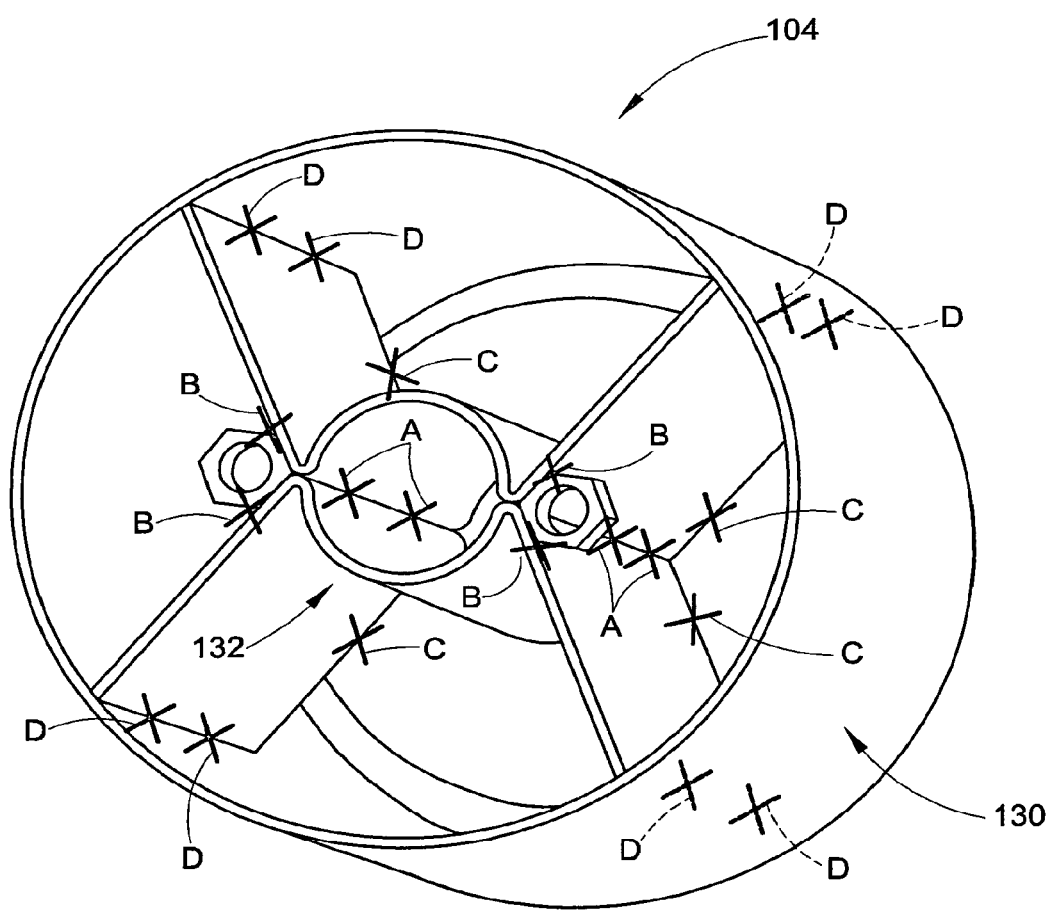
FIG. 5 is a bottom perspective view of the piston assembly in FIG. 3 illustrating one example of suitable joining positions.

Piston assembly 104, also shown in FIGS. 4 and 5, includes an outer shell 130 and a structural insert or support structure insert 132. Outer shell 130 includes a side wall 134 extending between a lower peripheral edge 136 and a generally rounded, upper rounded edge 138. Outer shell 130 also includes an end wall 140 that extends radially inwardly from edge 138 opposite side wall 134. End wall 140 includes a frustoconical portion 142, a bead-retaining groove 144, and a dish-shaped portion 146 that has a substantially flat bottom wall 148 and receives end closure 118. A hole 149 (FIG. 4) extends through bottom wall 148 of portion 146 and receives mounting stud 120, as discussed above. Side wall 134 and end wall 140 together define a shell cavity 150 having an open end (not numbered) opposite end wall 140.

Structural insert 132 includes a first or central support section or portion 152 and a second or outer section or portion that extends outwardly from the central support portion and includes support walls 154. Structural insert 132 extends axially between opposing insert end walls 156 and 158. In the embodiment shown in FIGS. 3-5, the central support portion and support walls extend between end walls 156 and 158, and are of a substantially equal height such that end walls 156 and 158 are substantially planar. It will be appreciated, however, that other configurations can alternately be used in which the heights of the central support portion and the support walls can be different. For example, the central support portion could have a greater height than the support walls such that end wall 156 is stepped at or along the central support portion. In such an arrangement the central support portion could engage the end wall of the outer shell with the support walls being spaced from the end wall. Additionally, or in the alternative, end wall 158 could be stepped such that the central support portion projects out of the shell cavity through the plane formed by the lower edge of the shell, with the support walls remaining within the shell cavity. Thus, in some embodiments at least some of the structural insert, such as the central support portion, for example, could project out of shell cavity 150 beyond lower peripheral edge 136.

As can be better seen in FIGS. 4 and 5, one exemplary embodiment of support structure insert 132 is formed from two insert members 160A and 160B that are fabricated from relatively thin-walled material. Each insert member 160 includes a first section 162 and outwardly extending second sections 164. In the exemplary embodiment shown in FIGS. 3-5, each insert member is shown as having a central first section with two second sections extending from opposite ends of the first section. However, it will be appreciated that any other suitable arrangement of first and second sections could alternately be used. For example, in other embodiments, only a single second section could be provided and extend from a single first section, such as might form a somewhat 7-shaped or L-shaped structure.

In the embodiment shown, two insert members are used and are oriented such that the first sections are adjacent one another. The adjacent first sections generally define central support portion 152 and a central passage 166 extending through the support structure insert. However, it is to be distinctly understood that any suitable number of sections, such as from 1 to 20 sections, for example, can alternately be used. In the exemplary embodiment in FIGS. 3-5, first sections 162 are shown as being curved such that the two adjacent first sections form central support portion 152 and passage 166 in an approximately cylindrical shape. However, in other embodiments, the first sections could include any other suitable shape or configuration, such as the first sections being approximately planar such that a resulting central support portion could have a polygonal or otherwise faceted shape, for example. Similarly, second sections 164 are shown in FIGS. 3-5 as being substantially planar and extending outwardly from the central support portion to form support walls 154. However, in other embodiments, the second sections could alternately take any other suitable shape or configuration, such as being curvilinear or faceted, for example.

In the exemplary embodiment shown in FIGS. 3-5, the insert members are somewhat M-shaped and have an included angle AG1 of about 60 degrees. However, it will be appreciated that angle AG1 can vary depending upon the number and configuration of insert members used. That is, as the number of insert members increase, angle AG1 will tend to decrease. As such, one exemplary range for angle AG1 is from about 20 degrees to about 160 degrees.

Insert members 160 are preferably joined to one another to at least partially form structural insert 132. However, it will be appreciated that the insert members could be used without being joined to one another without departing from the principles of the present novel concept. If joined to one another, insert members 160 can be joined in any suitable manner or combination of manners, such as by using interlocking structural features and/or mechanical fasteners (e.g., nuts/bolts or rivets), for example. Another example of a suitable manner of joining the insert members is shown in FIG. 5, in which insert members 160 are joined by welded joints A.

Structural insert 132 can optionally include suitable securement devices, such as weld nuts 168, for example. If included, as shown in FIGS. 3-5, the weld nuts can be attached in any suitable manner. In one exemplary embodiment, the weld nuts can be secured to structural insert 132, or including any component or combination of components thereof, using welded joints B, shown in FIG. 5. It will be appreciated, however, that any other suitable securement or fastening member can alternately or additionally be used and similarly or otherwise attached, such as mounting studs or bolts projecting outwardly beyond end wall 158, for example. In one embodiment, the securement devices are positioned between adjacent support walls. However, any suitable positioning or arrangement can alternately be used.

Suitable securement devices, such as washers 170 and bolts 172 can be used to attach the air spring assembly to an associated structural member SM2, such as a component of a vehicle, for example. Such securement devices can pass through one of a plurality of through holes STH that could be provided in structural member SM2 and threadably engage weld nuts 168 or another provided securement device. As an alternative to including securement devices such as weld nuts 168 and bolts 172, an elongated lower mounting stud 120' can optionally be used. Washer 122 and threaded nut 124 would remain in use to secure end closure 118 to piston 104. However, the elongated mounting stud could pass through one of holes STH in structural member SM2 and project outwardly therefrom. The end of the elongated stud could then receive a second washer 174 and threaded nut 176 to secure air spring assembly 100 on the structural member.

Once support structure insert 132 is formed, the same can be inserted into shell cavity 150. In one exemplary embodiment, end wall 156 is in abutting engagement with bottom wall 148 of dish-shaped portion 146. The support structure insert can then be secured in place within the shell cavity in any suitable manner. For example, in the exemplary embodiment shown in FIGS. 3-5, the support structure insert can optionally be secured by welding, such as by using welded joints C, for example, between and along the shell end wall and one or both of the central support portion and the support walls. Alternately, or additionally, optional welded joints D, for example, between and along the shell side walls and the support walls can also be used.

Figure 6:
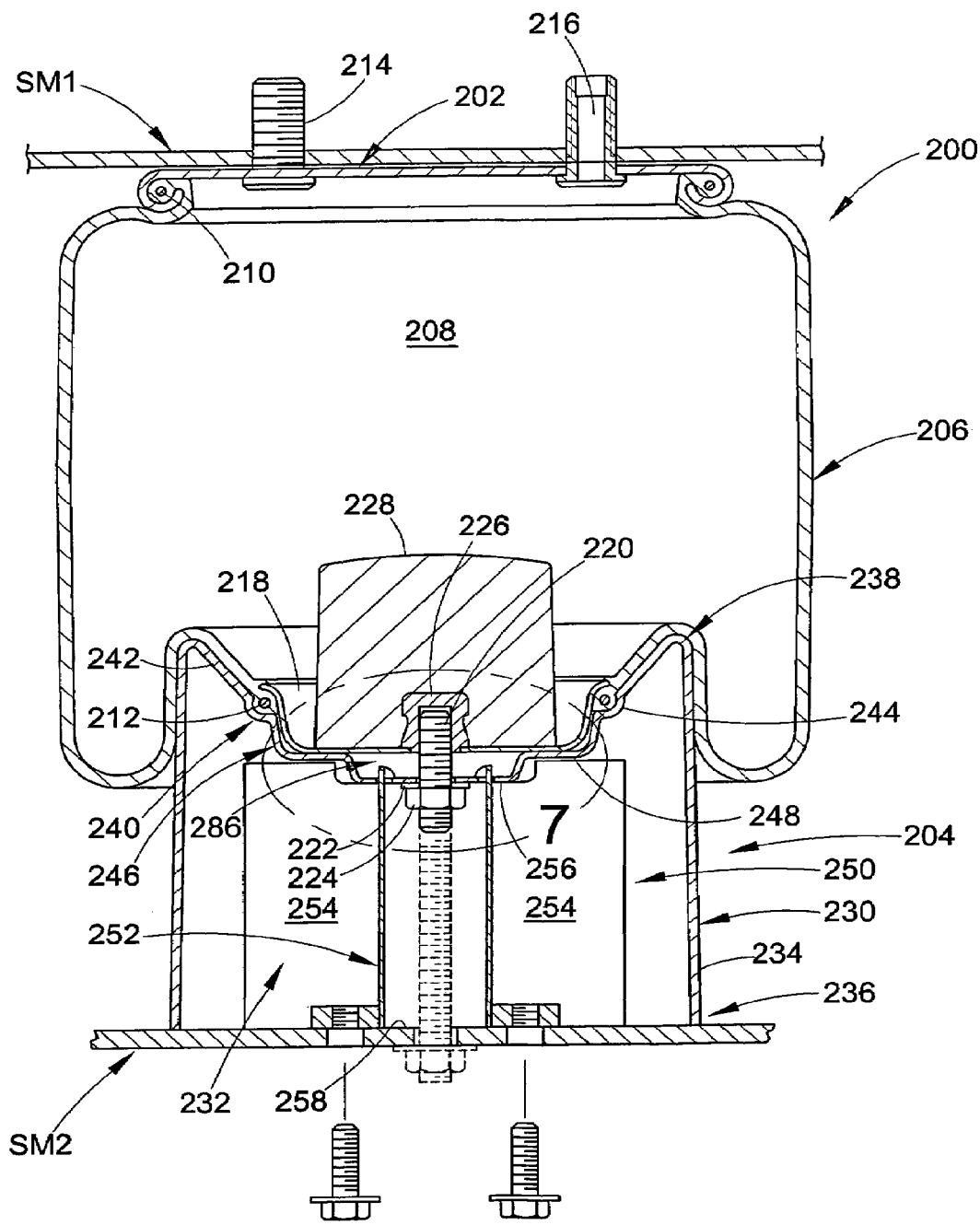
FIG. 6 is a cross-sectional side view of another embodiment of an air spring assembly in accordance with the present novel concept.
Figure 7:
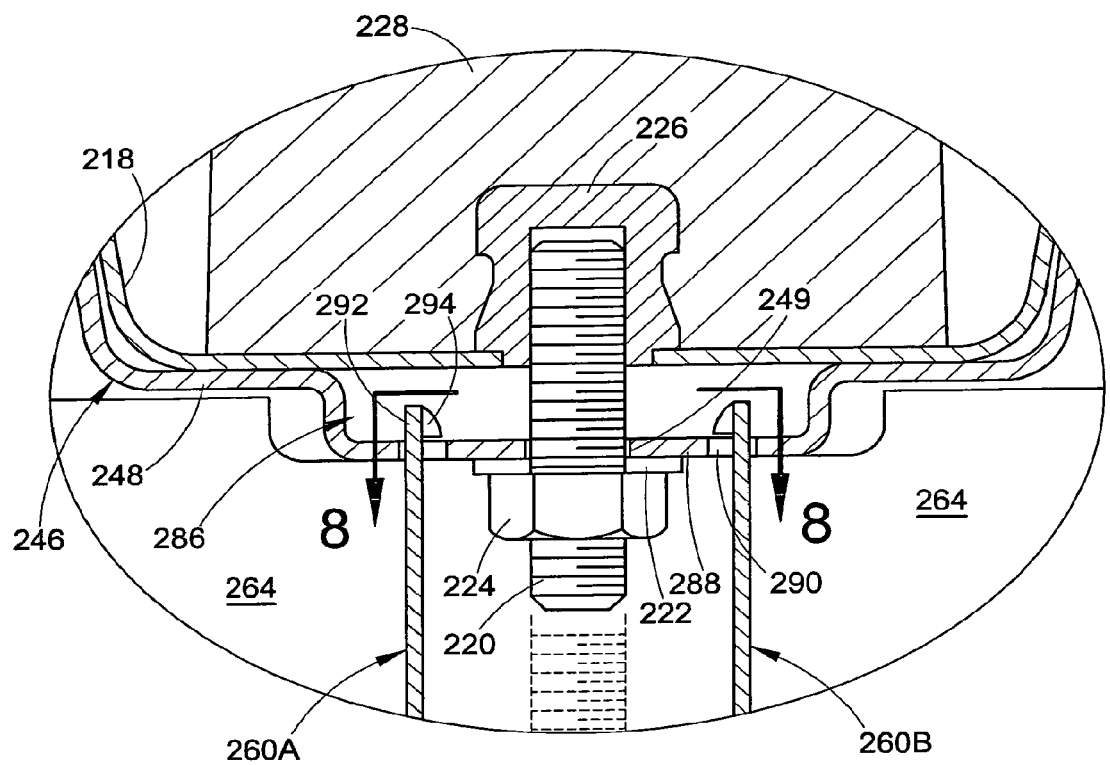
FIG. 7 is an enlarged cross-sectional side view of the portion of air spring assembly in detail 7 of FIG. 6.
Figure 8:
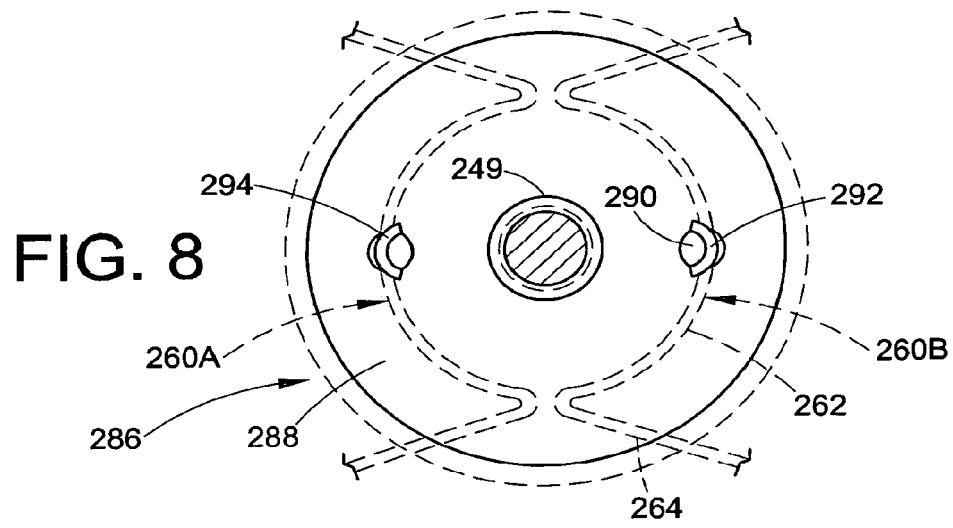
FIG. 8 is a cross-sectional top plan view of the portion of the air spring assembly in FIG. 7 taken along line 8-8.

Another exemplary embodiment of an air spring assembly 200 in accordance with the present novel concept is shown in FIGS. 6-8. It will be appreciated that air spring assembly 200 is substantially similar to air spring assembly 100 shown in and discussed with regard to FIGS. 3-5. As such, similar items will be shown and described using similar item numbers incremented by 100. Differences will be pointed out and discussed in detail where appropriated.

Air spring assembly 200 includes a first end member, such as a top or bead plate 202, for example, a second end member, such as a piston assembly 204, for example, and a flexible wall, such as a flexible sleeve 206, for example, secured therebetween and at least partially defining a spring chamber 208. An upper mounting bead 210 of flexible sleeve 206 is captured along bead plate 202. Additionally, one or more securement devices, such as mounting studs 214, for example, can be provided for use in securing the same on or along an associated structural member SM1. Furthermore, one or more fluid communication ports are provided that extend through the first end member and into fluid communication with spring chamber 208. In the exemplary embodiment shown, a fluid passage 216 extends through one of mounting studs 214, though it will be appreciated that any other suitable arrangement could alternately be used. A lower mounting bead 212 of flexible sleeve 206 is captured on piston assembly 204 by an end closure 218. In the present exemplary embodiment, the end closure is secured on piston assembly 204 using a lower mounting stud 220, a washer 222 and a threaded nut 224. The lower mounting stud engages a threaded bumper mount 226 that receives a jounce bumper 228.

Piston assembly 204 includes an outer shell 230 and a structural insert or support structure insert 232. Outer shell 230 includes a side wall 234 that extends between a lower peripheral edge 236 and a generally rounded, upper edge 238. Piston assembly 204 also includes an end wall 240 having a frustoconical portion 242, a bead-retaining groove 244 and a dish-shaped portion 246. One way that piston assembly 204 differs from piston assembly 104 is that dish-shaped portion 246 includes a bottom wall 248 with a recess 286 formed therein that includes a recess bottom wall 288, as is more clearly illustrated in FIGS. 7 and 8. A fastener-receiving hole 249 extends through recess bottom wall 288. Additionally, clip-receiving holes 290 are also formed through recess bottom wall 288 and are circumferentially spaced around hole 249.

Structural insert 232 is received in a shell cavity 250 formed by side wall 234 and end wall 240, and includes a first or central support section or portion 252 and a second or outer section or portion that extends outwardly from the central support portion and includes support walls 254. Central support portion 252 extends between insert end walls 256 and 258. In the exemplary embodiment shown in FIGS. 6-8, structural insert 232 is formed from insert members 260A and 260B that include first or central sections 262 and second or outer wall portions 264. Insert members 260 differ from insert members 160 in that one or more clips 292 project from insert end wall 256 and are received in clip-receiving holes 290 to secure the outer shell and the structural insert together. In the exemplary embodiment shown in FIGS. 6-8, clips 292 include spring corners 294 that extend outwardly beyond hole 290 to retain structural insert 232 on end wall 240. During installation, clips 292 are forced into holes 290 which causes spring corners to be deflected inwardly so that the clips can pass through the clip-receiving holes. Once through holes 290, spring corners 294 return to an outward position to engage recess bottom wall 288. As such, the use of welded joints and/or other mechanical fasteners can be avoided.

Figure 9:
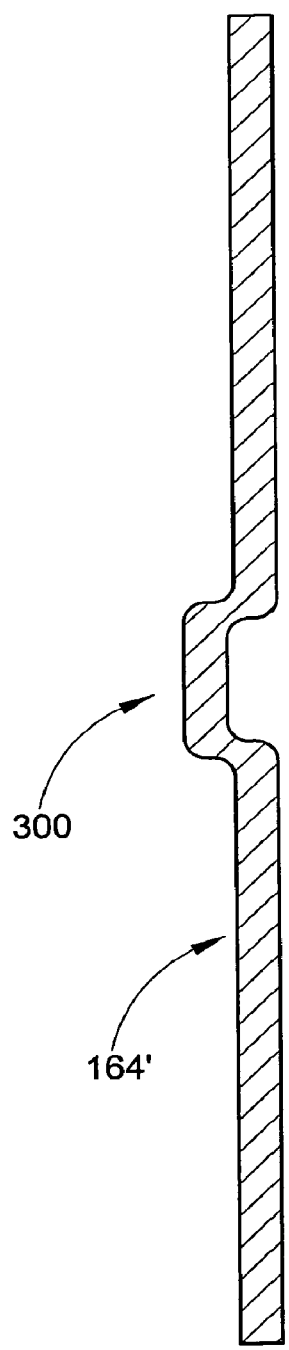
FIG. 9 is a cross-sectional side view of an alternate embodiment of a support wall in accordance with the present novel concept shown from along line 9-9 in FIG. 4.

FIG. 9 illustrates a stiffening rib or gusset 300 that can be optionally included along either or both of the first and second sections of an insert member, such as first sections 162 and 262, for example, and/or second sections 164 and 264, for example, respectively of insert members 160 and 260. In FIG. 9, stiffening rib 300 is shown as being formed along a first section 164'. However, it is to be understood that the stiffening ribs, such as those shown and described, for example, can be used on any of the walls or wall sections herein without departing from the principles of the present novel concept. In one embodiment of the structural insert, stiffening rib 300 is provided along at least the second sections. This acts to increase the moment of inertia of the second sections, which permits the use of material having a reduced wall thickness. Thus, material savings can be achieved by forming the stiffening rib along the insert members.

Figure 10:
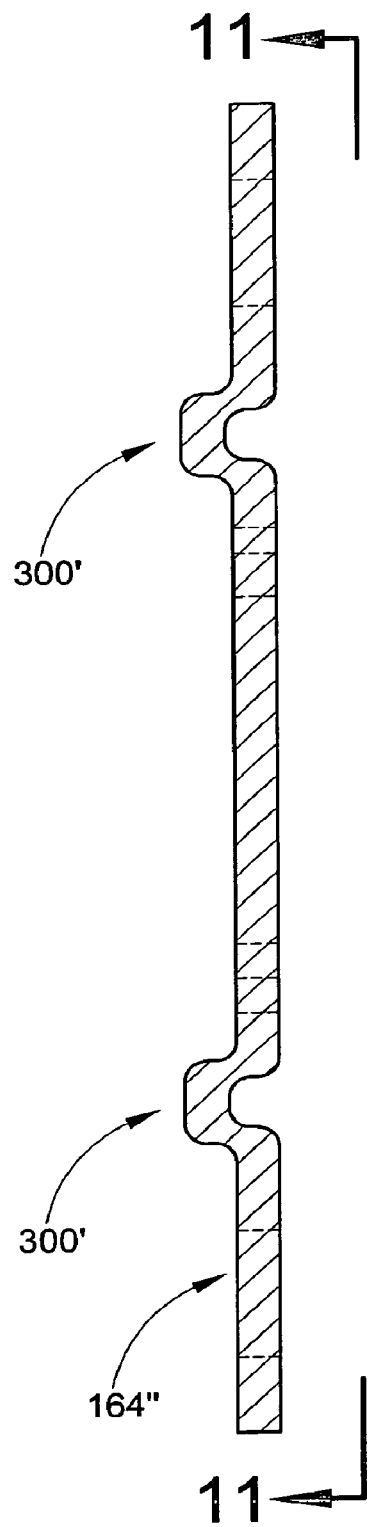
FIG. 10 is a cross-sectional side view of another alternate embodiment of the support wall in FIG. 9.
Figure 11:
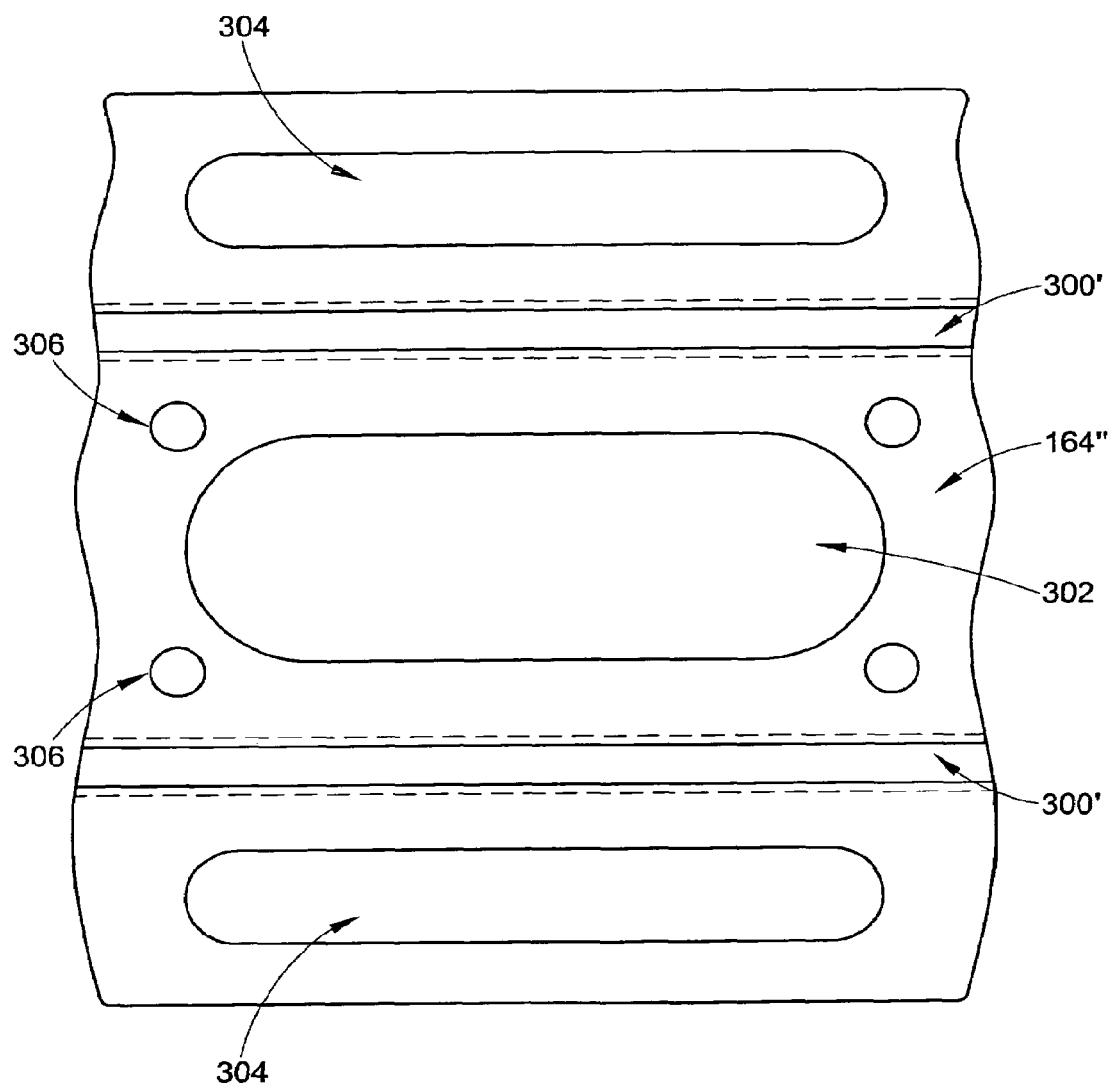
FIG. 11 is a side view of the support wall in FIG. 10 taken from line 11-11 showing material reduction areas.

An alternate embodiment of a wall 164" having a plurality of stiffening ribs or gussets 300' is shown in FIGS. 10 and 11. Stiffening ribs 300' have a somewhat different shape than ribs 300 in FIG. 9. However, it will be appreciated that any suitable number, shape and/or configuration of ribs can alternately be used without departing from the principles of the present novel concept. Additionally, FIGS. 10 and 11 illustrate material reduction areas 302, 304 and 306 from which the material of the wall section has been removed. It will be appreciated that material reduction areas of any suitable shape, size, number and/or configuration can be used, alone or in combination. Furthermore, it is to be understood that the use of stiffening ribs and/or material reduction areas, such as those shown and described, for example, are optional and can be used on any of the walls or wall sections herein without departing from the principles of the present novel concept.

Figure 12:
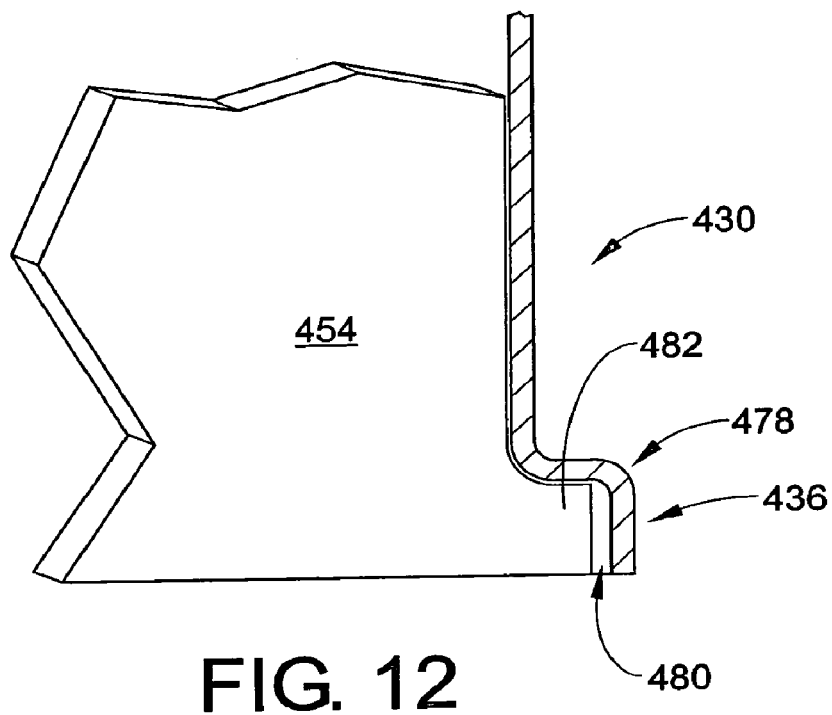
FIG. 12 is a cross-sectional side view of an alternate embodiment of a piston assembly in accordance with the present novel concept shown from along line 12-12 in FIG. 4.

FIG. 12 illustrates another exemplary embodiment of an outer shell 430, representative of any suitable outer shell, such as 130 and/or 230, for example. Outer shell 430 includes a modified lower peripheral edge 436 having a radially outwardly stepped shoulder 478. Such a construction may assist in increasing circumferential or hoop strength of the outer shell. Additionally, shoulder 478 provides an annular space 480 within the shell cavity. An alternate embodiment of a support wall 454 can include a projection 482 that extends into annular space 480 and engages shoulder 478. In such an arrangement, some amount of a compression load may be transferred through the outer shell and carried by a portion of the support wall. This can increase the strength and rigidity of a resulting piston assembly, and may assist in avoiding the use of optional welded joints D, discussed above.

Figure 13:
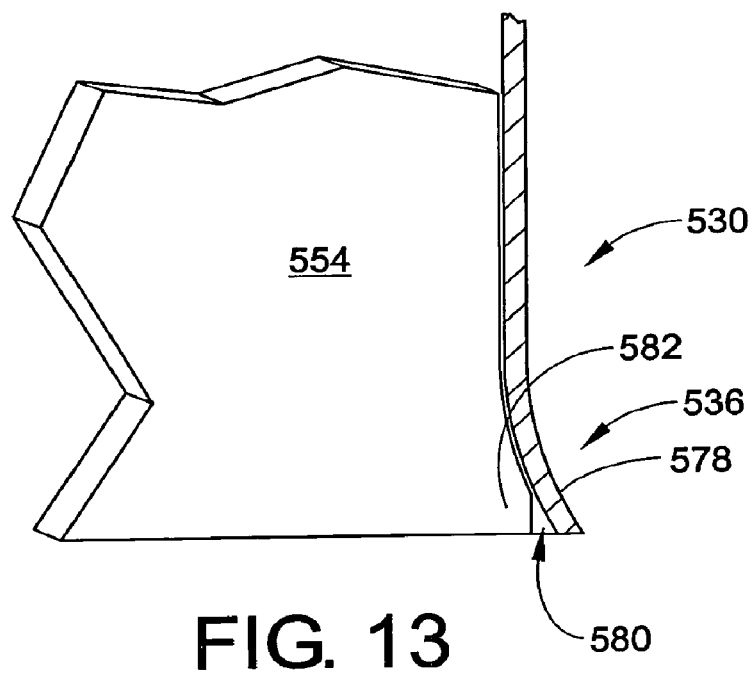
FIG. 13 is a cross-sectional side view of another alternate embodiment of the piston assembly in FIG. 12.
Figure 14:
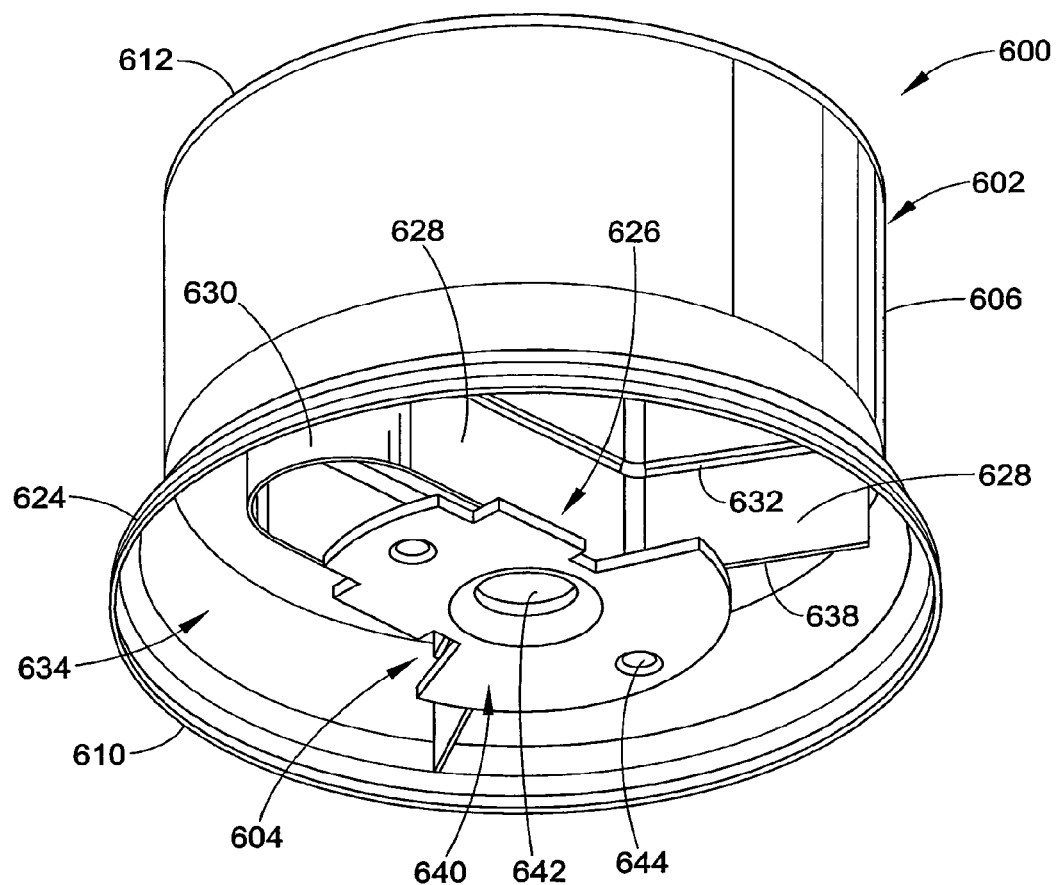
FIG. 14 is a bottom perspective view of another alternate embodiment of a piston assembly in accordance with the present novel concept.
Figure 15:
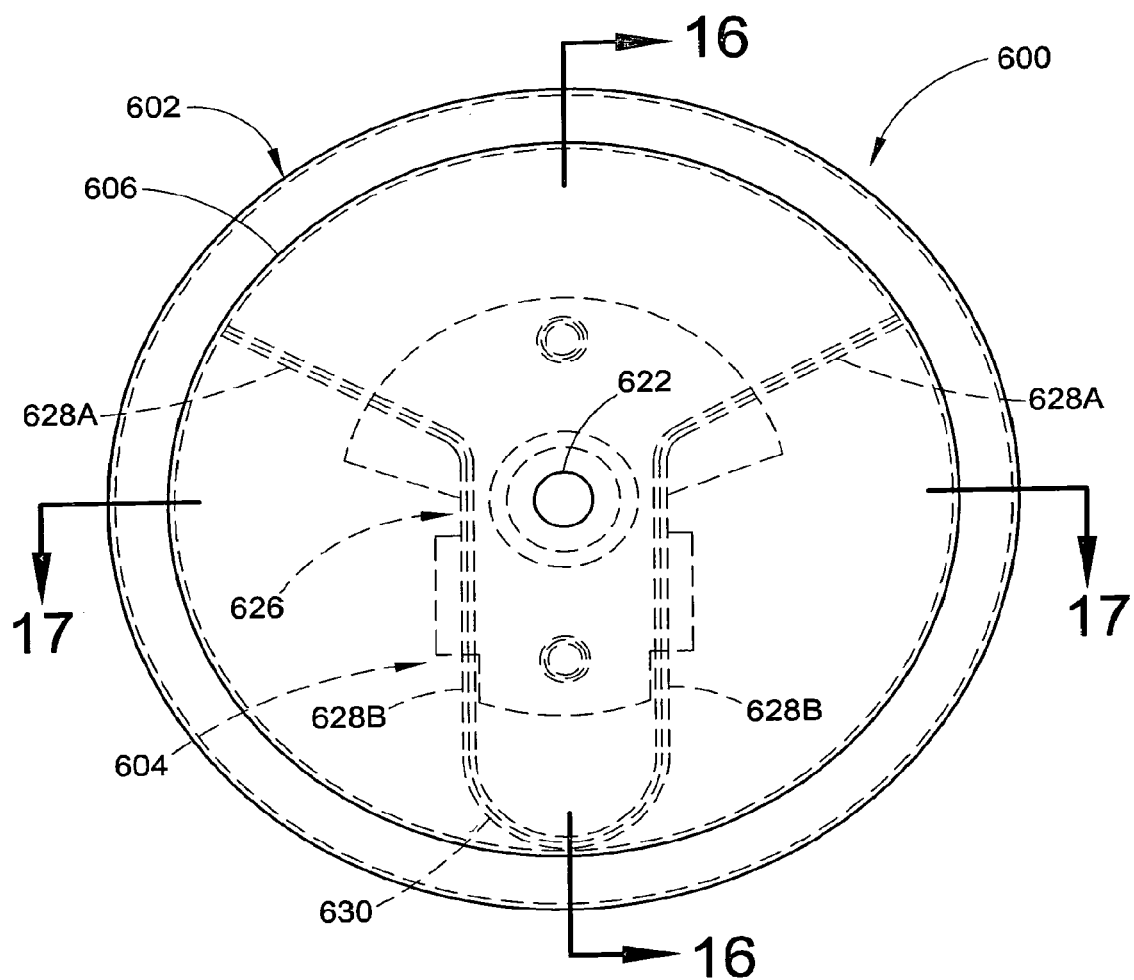
FIG. 15 is a bottom plan view of the piston assembly in FIG. 14.

FIG. 13 illustrates a further exemplary embodiment of an outer shell 530, representative of any suitable outer shell, such as 130 and/or 230, for example. Outer shell 530 includes a modified lower peripheral edge 536 having a radially outwardly flared wall portion 578. As with edge 436 discussed above, such a construction may assist in increasing the circumferential or hoop strength of the outer shell. Additionally, the flare provides additional space 580 within the shell cavity. An alternate embodiment of a support wall 554 can include a projection 582 that extends into the additional space and engages the side wall of the outer shell to take some compression load. Again, this can increase the strength and rigidity of a resulting piston assembly, and may assist in avoiding the use of optional welded joints D, discussed above.

FIGS. 14-17 illustrate another alternate embodiment of a piston assembly 600 in accordance with the present novel concept. Piston assembly 600 includes an outer shell 602 and a support structure insert or structural insert 604. Piston assembly 600 is similar to piston assemblies 104 and 204 discussed in detail hereinbefore and, as such, is suitable for use in similar environments and/or applications, such as a component of an air spring assembly, for example. Outer shell 602 includes a side wall 606 and an end wall 608, which are, in one exemplary embodiment, integrally formed from thin-walled metal material.

Side wall 606 extends between a lower peripheral edge 610 and a generally rounded, upper edge 612. End wall 608 includes a frustoconical portion 614, a bead-retaining groove 616, and a dish-shaped portion 618 having a substantially flat bottom wall 620. In one exemplary embodiment, dish-shaped portion 618 and bottom wall 620 can optionally include a recess (not shown) and recess bottom wall (not shown) that are substantially similar to recess 286 and recess bottom wall 288 shown in and described with regard to air spring assembly 200 in FIGS. 6-8, for example. Additionally, one or more clip-receiving holes (not shown), such as holes 290, for example, can optionally be disposed along such a recess bottom wall, if provided. In another exemplary embodiment, a fastener-receiving hole 622 extends through bottom wall 620 for receiving a mounting stud (not shown) or other suitable securement device.

Furthermore, outer shell 602 can optionally include an outwardly flared wall portion 624 disposed along lower peripheral edge 610. It will be appreciated, however, that any other suitable shape or configuration of outwardly flared portion 624 can alternately be used.

Structural insert or support structure insert 604 includes a first or central support section or portion 626 and a second or outer section or portion that extends outwardly from the central support section and includes support walls 628. Structural insert 604 differs from earlier described structural inserts, such as structural inserts 132 and 232, for example, in that structural insert 604 is somewhat Y-shaped and has an open central support portion 626 rather than an approximately, cylindrical central support portion as in the other embodiments. Additionally, central support portion 626 and support walls 628 of structural insert 604 are formed from a single piece or sheet of material, whereas other embodiments include two or more insert members. As such, structural insert 604 includes opposing support walls 628A that extend outwardly from central support portion 626. Additionally, support walls 626B extend outwardly from central support portion 626 in approximate alignment with one another and are connected by a curved end portion 630 disposed adjacent side wall 606 of outer shell 602. One or more stiffening ribs 632 and/or other features, such as suitable material reduction areas (not shown), for example, can also optionally be used.

Structural insert 604 is disposed within a shell cavity 634 formed within outer shell 606 such that a first or upper end 636 of the structural insert is disposed along bottom wall 620 of end wall 608. Optionally, one or more clips (not shown) can project from the first or second portions of the structural insert, such as from along first end 636, for example. Such clips, if provided could extend through any corresponding clip-receiving holes (not shown) to secure or otherwise retain the outer shell on the structural insert. Alternately, the structural insert and outer shell can be secured together in any suitable manner, such as by using fasteners or welded joints, for example.

Figure 16:
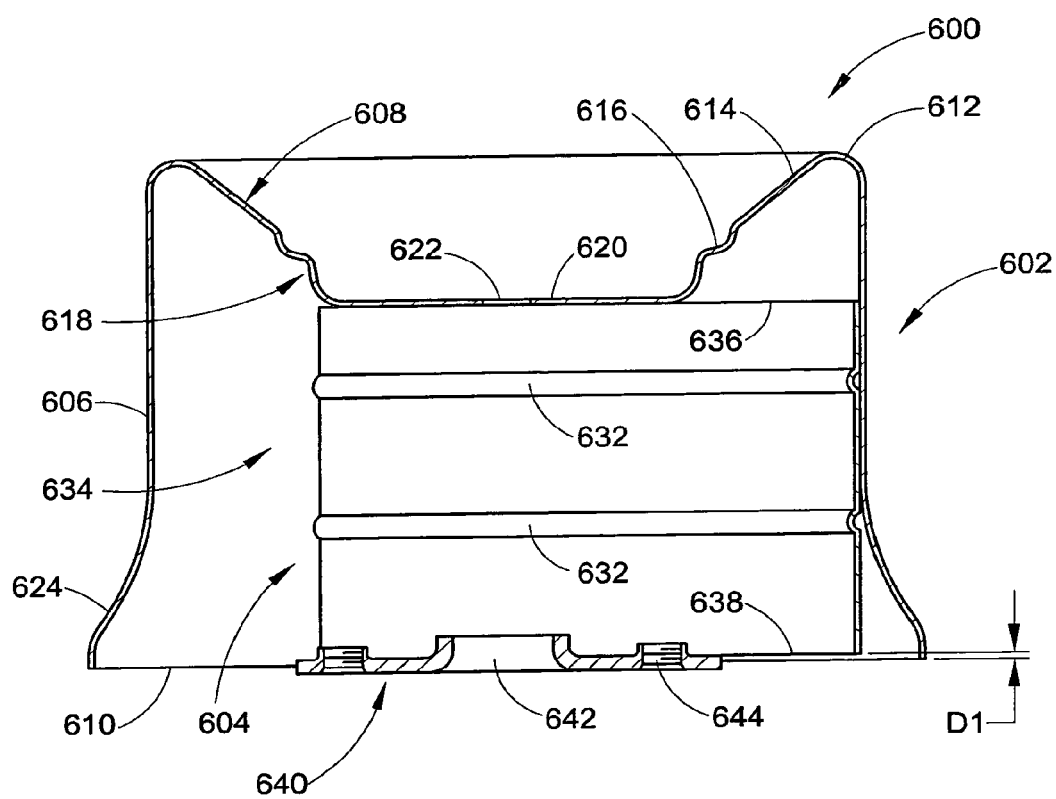
FIG. 16 is a cross-sectional side view of the piston assembly in FIGS. 14 and 15 taken along line 16-16 in FIG. 15.
Figure 17:
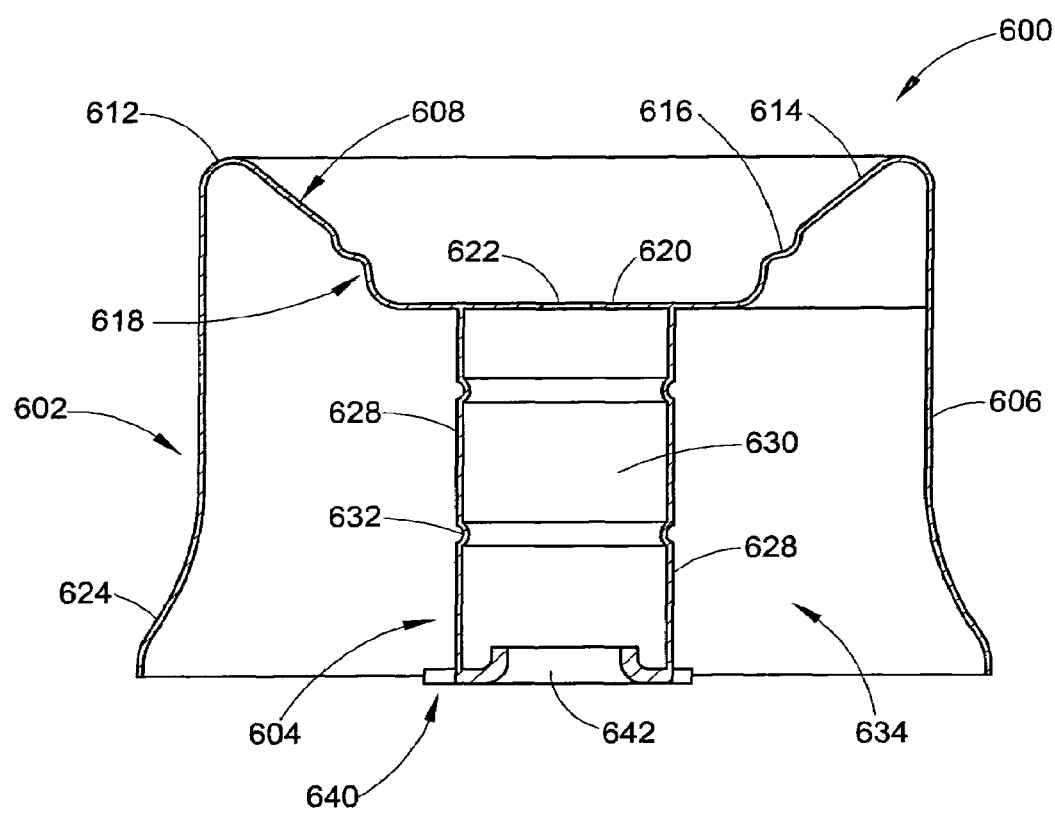
FIG. 17 is a cross-sectional side view of the piston assembly in FIGS. 14 and 15 taken along line 17-17 in FIG. 15.

As can be more clearly seen in FIG. 16, a bottom end 638 of structural insert 604 is received within lower peripheral edge 610 of side wall 606, as indicated by dimension D1. In one exemplary embodiment, a securement device is disposed along bottom end 638 of central support portion 626 and/or support walls 628 of structural insert 604. In the exemplary embodiment shown, the securement device includes a mounting plate 640 that engages structural insert 604 along central support portion 626 as well as along support walls 628. Mounting plate 640 extends outwardly beyond lower peripheral edge 610 of side wall 606 and is suitable for engaging an associated structural member (not shown) while maintaining lower peripheral edge 610 in spaced relation to such an associated structural member. A passage or opening 642 extends through mounting plate 640 and is in approximate alignment with fastener-receiving hole 622. Additionally, threaded holes 644 or other suitable features can optionally be included along mounting plate 644, such as for receiving suitable fasteners or other components to secure piston assembly 600 on or along an associated structural member.

Though further analysis may be performed, significant reductions in material usage are expected due to the use of the piston assembly constructions embodied herein. For example, the outer shell and center column of the known design shown in FIG. 1 are typically formed from steel material having a thickness of about 0.118 inches (or about 3 mm). Additionally, the base is typically formed from steel material having a thickness of from about 0.196 inches to about 0.236 inches (or from about 5 mm to about 6 mm). The present novel concept is expected to enable the outer shell to be reduced in thickness by about 100 percent. That is, the expected reduction in material thickness for the outer shell is from about 0.118 inches (3 mm) to a material thickness of about 0.059 inches (or about 1.5 mm).

Additionally, the center column and base have been eliminated. These components are replaced by the support structure insert that is expected to be formed from steel material having a thickness of about 0.059 inches (or 1.5 mm). It will be appreciated that the central support portion of the support structure insert functions in a capacity similar to that of the center column in the known metal design. The center column is commonly formed from steel material having a thickness of about 0.196 inches (or 5 mm). The support structure insert, including the central support portion, is expected to be made from steel material having a thickness of 0.059 inches (or 1.5 mm). As such, a reduction in material thickness of about 300 percent is anticipated. Furthermore, the 0.059 inch (or 1.5 mm) thick material is used for the planar sections that form the support walls that have been added. This will act to offset the material reduction resulting from the elimination of the base. However, significant material savings is expected over known designs.

Figure 18:
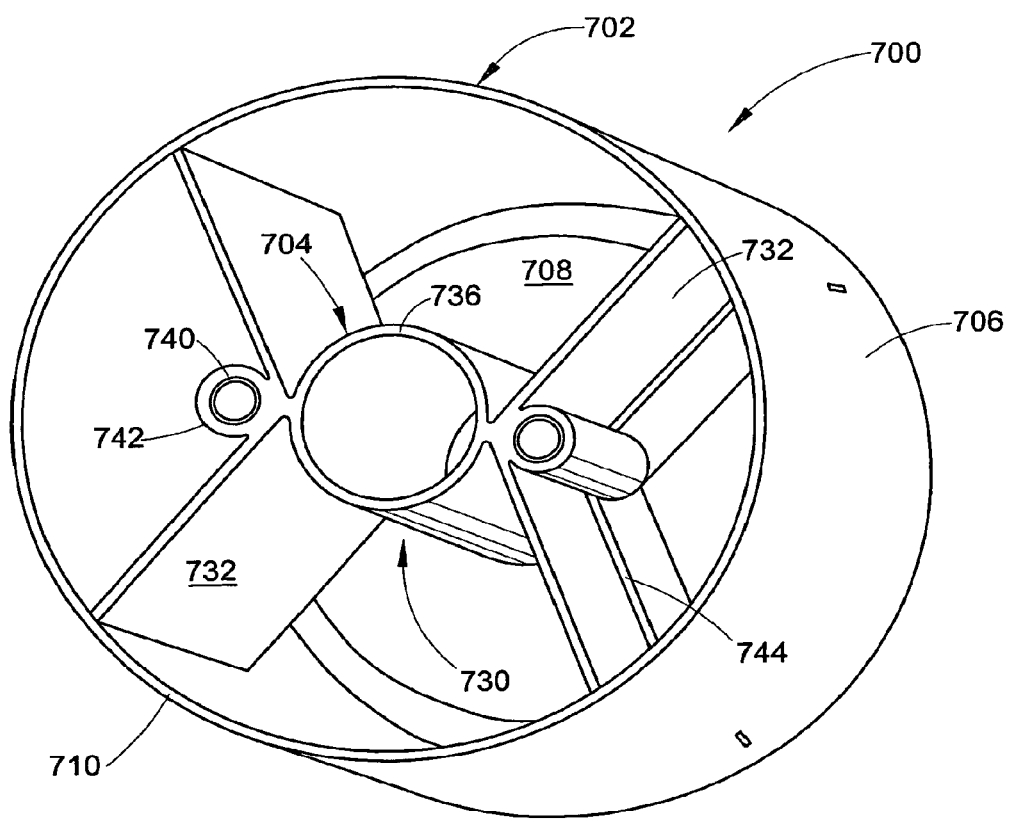
FIG. 18 is a bottom perspective view of a further alternate embodiment of a piston assembly in accordance with the present novel concept.
Figure 19:
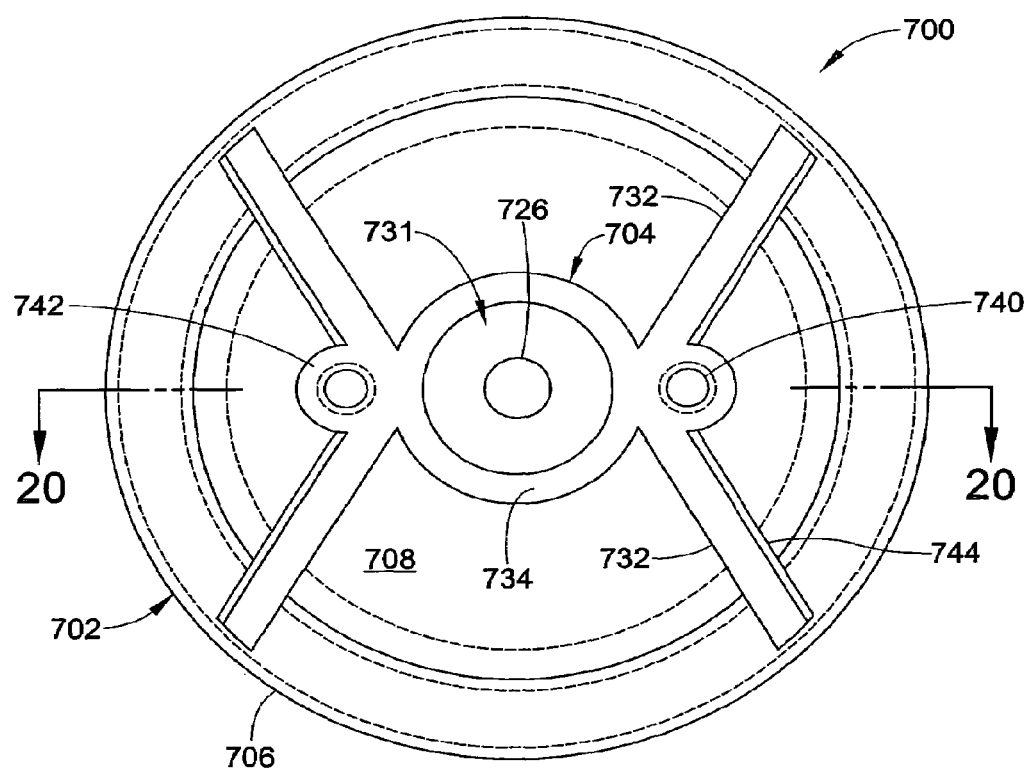
FIG. 19 is a bottom plan view of the piston assembly in FIG. 18.
Figure 20:
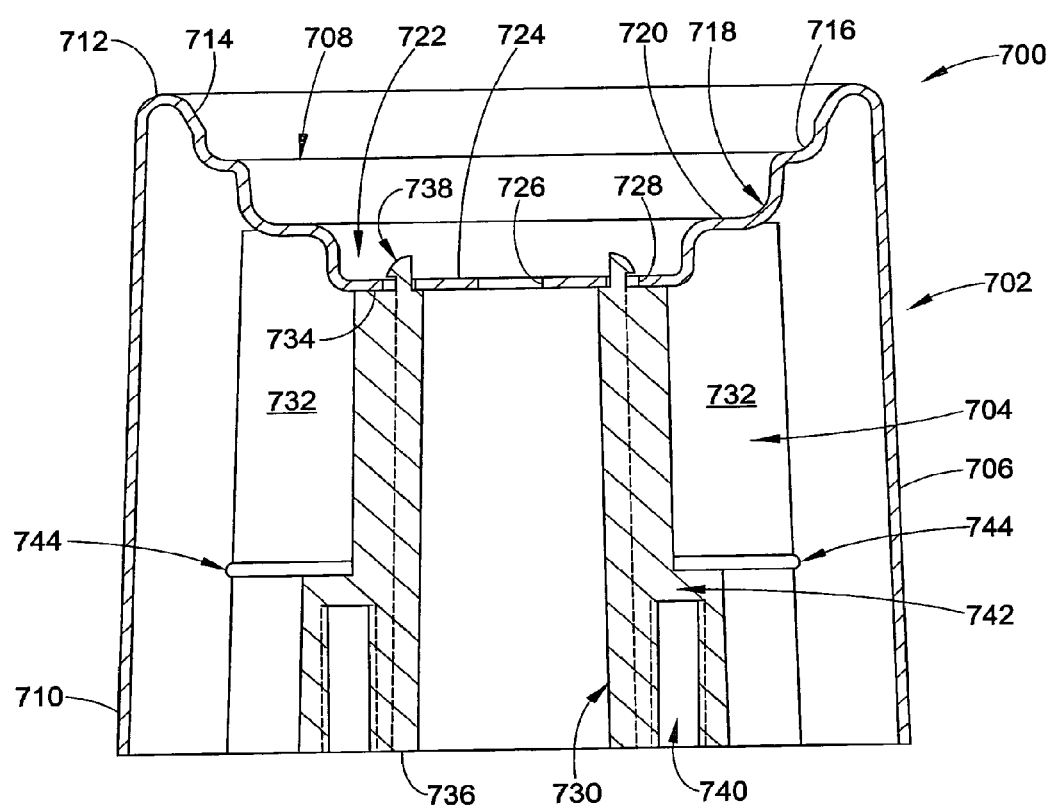
FIG. 20 is a cross-sectional side view of the piston assembly in FIGS. 18 and 19 taken along line 20-20 in FIG. 19.
Figure 21:
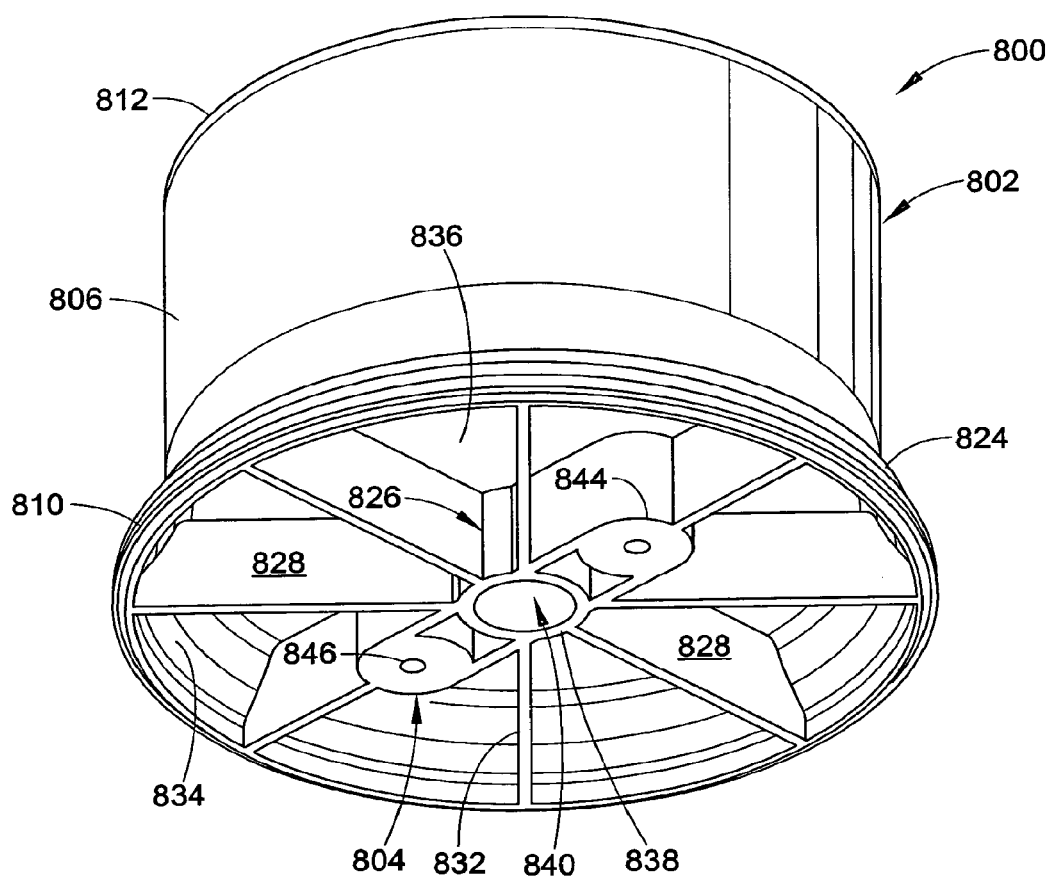
FIG. 21 is a bottom perspective view of still a further alternate embodiment of a piston assembly in accordance with the present novel concept.
Figure 22:
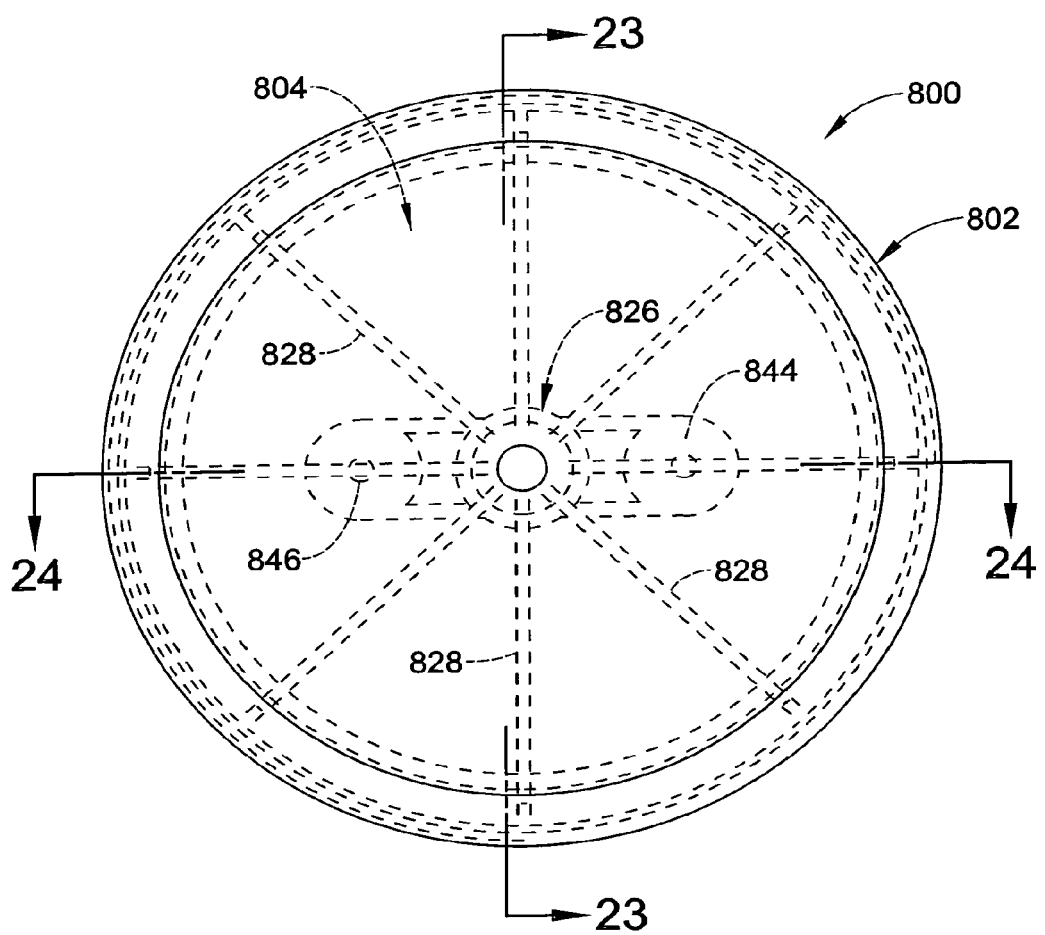
FIG. 22 is a bottom plan view of the piston assembly in FIG. 21.
Figure 23:
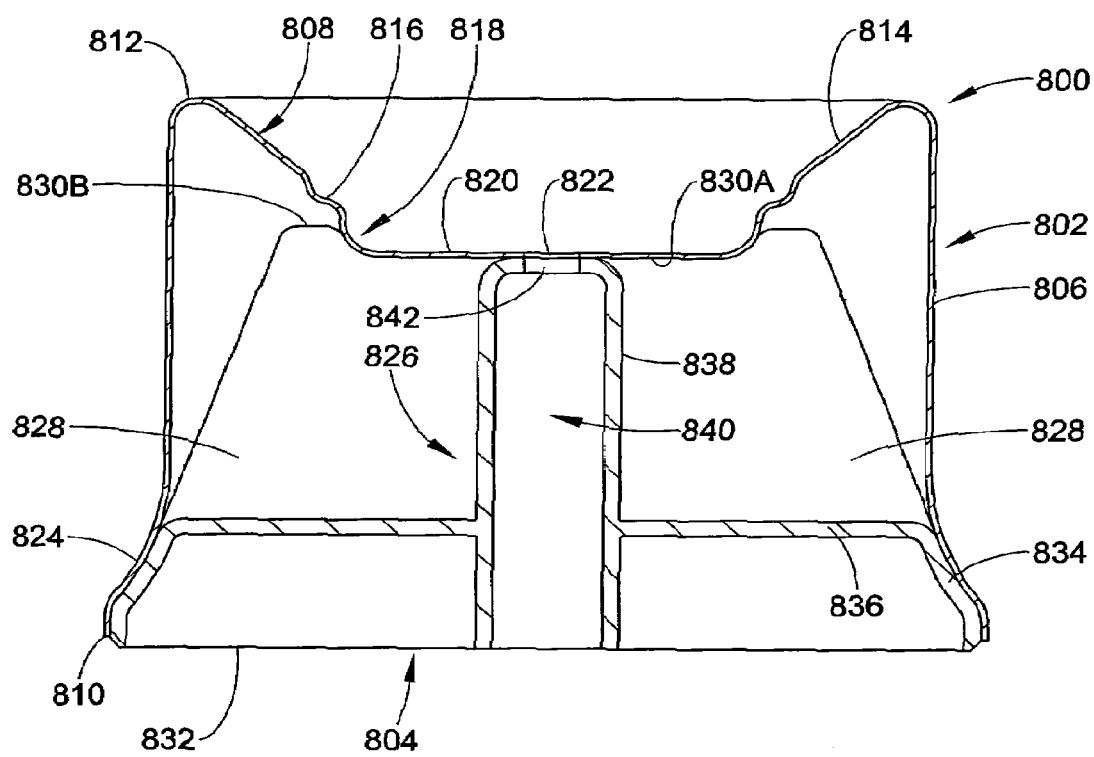
FIG. 23 is a cross-sectional side view of the piston assembly in FIGS. 21 and 22 taken along line 23-23 in FIG. 22.
Figure 24:
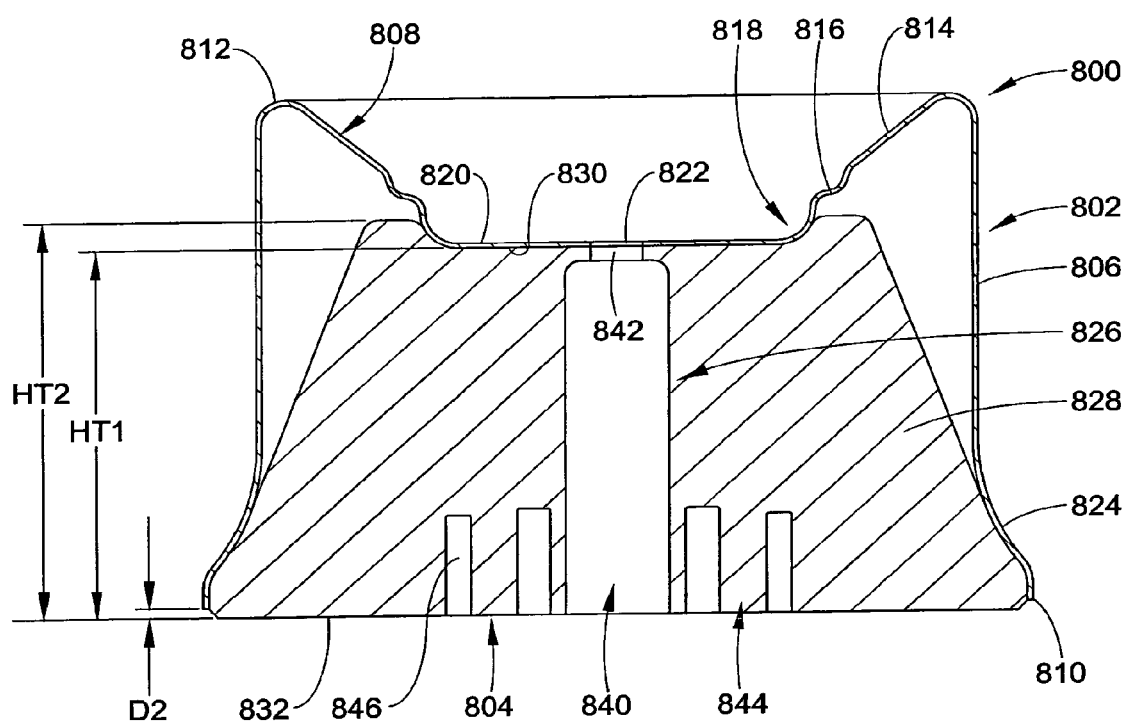
FIG. 24 is a cross-sectional side view of the piston assembly in FIGS. 21 and 22 taken along line 24-24 in FIG. 22.

Another alternate embodiment of a piston assembly 700 is shown in FIGS. 18-20, and includes an outer shell 702 and a structural insert or a support structure insert 704. Piston assembly 700 is similar to piston assemblies 104, 204 and 600 discussed in detail hereinbefore. However, piston assembly 700 differs from these earlier described piston assemblies in that structural insert 704 is at least partially formed from a plastic material instead of a metal material, such as steel.

Outer shell 702 includes a side wall 706 and an end wall 708, which are, in one exemplary embodiment, integrally formed from thin-walled metal material. Side wall 706 extends between a lower peripheral edge 710 and a generally rounded, upper edge 712. End wall 708 includes a frustoconical portion 714, a bead-retaining groove 716 and a dish-shaped portion 718 having a substantially flat bottom wall 720. In one exemplary embodiment, dish-shaped portion 718 and bottom wall 720 include a recess 722 and recess bottom wall 724, which in one embodiment are similar to recess 286 and recess bottom wall 288 described hereinbefore. Additionally, a fastener-receiving hole 726 extends through recess bottom wall 724 and a plurality of clip-receiving holes 728 are disposed circumferentially about hole 726.

Structural insert 704 includes a first or central support section or portion 730 and a second or outer section or portion that extends outwardly from the first support section and includes support walls 732. Structural insert 704 extends between axially opposing end walls 734 and 736. In one exemplary embodiment, one or more clips 738 extend from end wall 734 and are suitable for engaging recess bottom wall 724 through holes 728 and thereby securing the outer shell and structural insert together. It will be appreciated that clips 738 can take any suitable shape, size, form or configuration without departing from the present novel concept. Additionally, it will be appreciated that any other alternate arrangement can be used to secure the outer shell and structural insert together.

Structural insert 704 also includes threaded inserts 740 received within bosses 742 formed along end wall 736. The threaded inserts are suitable for receiving fasteners to secure the piston on an associated structural member, such as a suspension member of a vehicle, for example. Similar threaded inserts and bosses could alternately be provided along end wall 734 in place of clips 738. Likewise, retaining clips similar to clips 738 could optionally be provided along end wall 736 in place of inserts 740 and bosses 742.

Structural insert 704 can be manufactured by any suitable plastic manufacturing process, such as extrusion, for example. In such case, threaded inserts 740 could be welded, such as by ultrasonic welding, for example, or otherwise inserted into the bosses. In a preferred arrangement, insert 704 is molded, such as by using an injection molding process. In such case, threaded inserts 740 could be molded into the structural insert or installed in a subsequent process.

The wall thickness in FIGS. 18-20, though not to be scaled, is shown as being substantially thicker than the corresponding metal wall thicknesses, such as in FIGS. 3-5 and 14-17. One exemplary range for the wall thickness of insert 704 is from about 0.118 inches to about 0.157 inches (or from about 3 mm to about 4 mm). Thus, it is expected that substantial material savings can be attained over known pistons formed substantially entirely from plastic material. Additionally, an optional stiffening rib 744 can be provided along a suitable mold parting line for providing additional wall stiffness.

A further alternate embodiment of a piston assembly 800 is shown in FIGS. 21-24, and includes an outer shell 802 and a structural insert or support structure insert 804. Piston assembly 800 is similar to piston assemblies 104, 204, 600 and 700 as discussed in detail hereinbefore and, as such, is amenable to use in similar environments and applications, such as use in air spring assemblies, for example.

Outer shell 802 includes a side wall 806 and an end wall 808, which are, in one exemplary embodiment, integrally formed from thin-walled metal material. Side wall 806 extends between a lower peripheral edge 810 and a generally rounded, upper edge 812. End wall 808 includes a frustoconical portion 814, a bead-retaining groove 816, and a dish-shaped portion 818 having an approximately flat bottom wall 820. A hole or opening 822 extends through bottom wall 820 and is suitable for receiving a mounting stud or other securement device (not shown). Side wall 806 includes an outwardly flared portion 824 disposed toward lower peripheral edge 810.

Optionally, dish-shaped portion 818 and bottom wall 820 can include a recess (not shown) and a recess bottom wall (not shown) that are substantially similar to recess 286 and recess bottom wall 288 shown in and discussed with regard to piston assembly 204 of air spring assembly 200, for example. Additionally, one or more clip-receiving holes (not shown) could optionally be provided along the recess bottom wall, if provided.

Structural insert 804 includes a first or central support section or portion 826 and a second or outer support section or portion that extends outwardly from the central support section and includes support walls 828. Structural insert 804 extends between axially first and second opposing end walls 830 and 832. As discussed above, either or both end walls can optionally be stepped or otherwise include multiple heights.

In the exemplary embodiment shown, first end wall 830 includes a first section 830A formed along inward portions of support walls 828 that has a lower relative height HT1. A second section 830B formed along outward portions of support walls 828 has a greater relative height HT2. It will be appreciated, however, that any other arrangement can alternately or additionally be used.

Structural insert 804 differs, at least according to one aspect, from other structural inserts shown and discussed herein, such as structural insert 704, for example, in that structural insert 804 optionally includes an outer peripheral wall 834 that interconnects support walls 828. Additionally, outer peripheral wall 834 is complimentary to outwardly flared portion 824 of side wall 806, such that the outer peripheral wall can be in abutting engagement with the outwardly flared portion when structural insert 804 is received within outer shell 802. One or more intermediate walls 836 can optionally be provided in addition or in the alternative to outer peripheral wall. The one or more intermediate walls, if provided, extend between the support walls and can provide additional structural integrity thereto.

Central support section 826 of structural insert 804 includes a central wall 838 forming a central passage 840 at least partially through structural insert 804. Support walls 828 outwardly extend outwardly from along central wall 838. A hole or opening 842 is disposed along one end of central passage 840 and is cooperable with hole 822 in outer shell 802. The opposing end of central passage 840 is open and is suitable for receiving a securement device, such as a mounting stud (not shown), washer (not shown) and/or threaded nut (not shown), for example. Alternately, structural insert 804 could include one or more clips (not shown) that project from the first or second portions of the structural insert, such as from along first end 830, for example. Such clips, if provided could extend through any corresponding clip-receiving holes (not shown) that may be provided in the outer shell to secure or otherwise retain the outer shell and the structural insert together. Alternately, the structural insert and outer shell can be secured together in any suitable manner, such as by using fasteners, for example.

Second end wall 832 is formed, at least in part, from end portions of support walls 828. In the exemplary embodiment shown, second end wall 832 extends outwardly from outer shell 802 beyond lower peripheral edge 810 thereof, as indicated by distance dimension D2. Additionally, structural insert 804 includes bosses 844 disposed between adjacent ones of support walls 828. Suitable securement devices, such as threads or threaded inserts 846, can be provided within or along bosses 844.

Structural insert 804 can be manufactured by any suitable plastic manufacturing process. Additionally, threaded inserts (not shown) could be welded, such as by ultrasonic welding, for example, or otherwise inserted into the bosses. In a preferred arrangement, structural insert 804 is molded, such as by using an injection molding process. In such case, threaded inserts (not shown) could be molded into the structural insert or installed in a subsequent process. However, in the exemplary embodiment shown, holes 846 are provided and are suitable for receiving a securement device, such as a self-tapping threaded fastener (not shown), for example.

Figure 25:
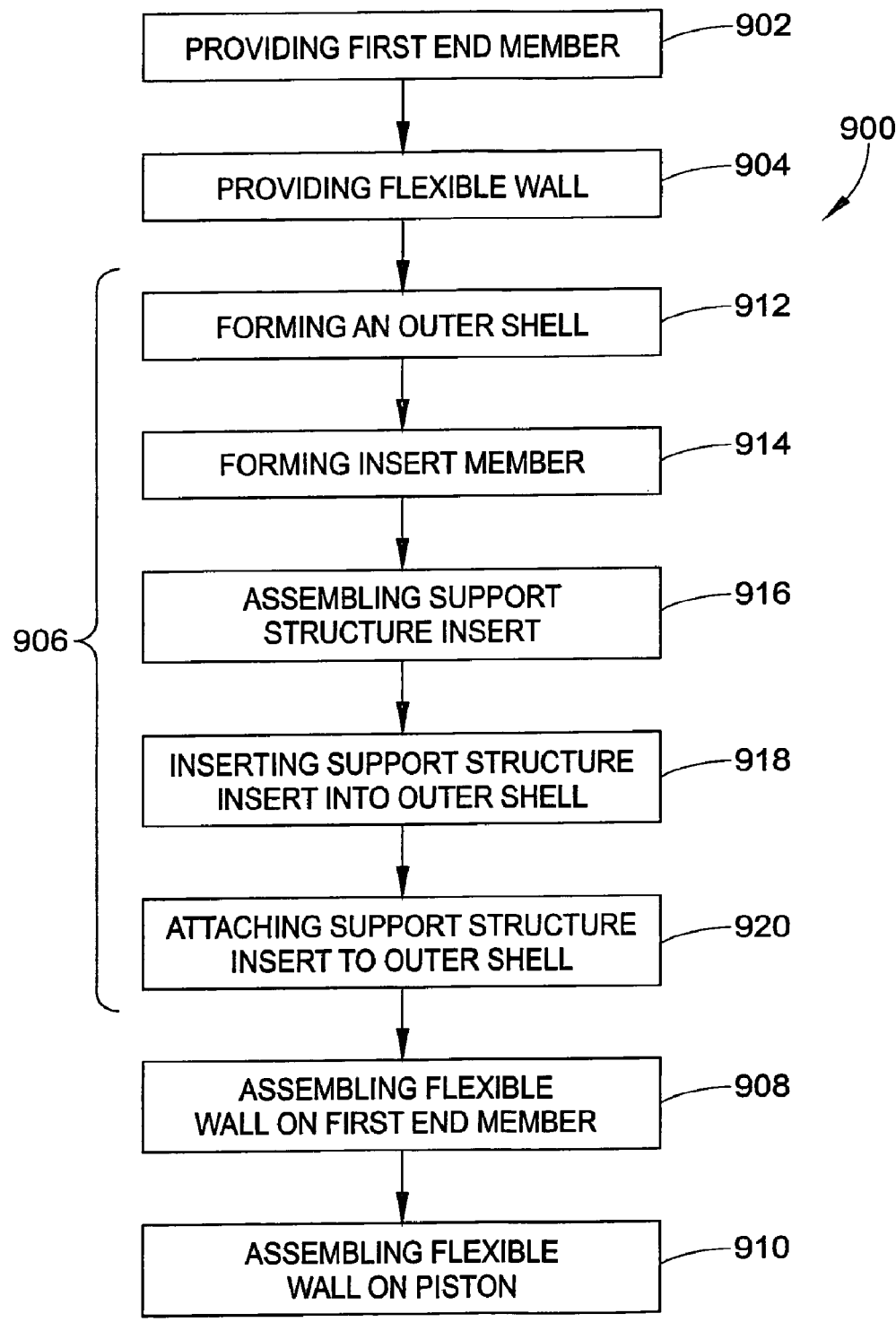
FIG. 25 is a flowchart illustrating an exemplary method of manufacturing an air spring assembly in accordance with the present novel concept.

FIG. 25 illustrates steps of one exemplary method 900 of manufacturing an air spring assembly in accordance with the present novel concept. Method 900 includes a step 902 of providing a first end member, such as a bead plate 102, for example. Another step 904 includes providing a flexible wall, such as sleeve 106, for example. Still another step 906 includes assembling a piston, such as piston assembly 104,

204, 600, 700 or 800, for example, having an outer shell, such as outer shell 130, for example, and a support structure insert, such as insert 132, for example. A further step 908 includes assembling the flexible wall on the first end member. Still a further step 910 includes assembling the flexible wall on the piston assembly to form the completed air spring assembly.

One example of step 906 can optionally include performing additional steps, including, for example, a step 912 that can include forming an outer shell having a side wall and an end wall that together form a shell cavity having an open end. Step 906 can also optionally include, for example, a step 914 that can include forming at least one insert member having at least one outwardly extending support wall. Step 906 can also optionally include, for example, a step 916 that can include assembling one or more insert members into a support structure insert having a central support portion and a plurality of support walls extending outwardly therefrom. As an alternative to performing steps 914 and 916, step 906 can optionally include forming an approximately unitary structural insert having outwardly extending support walls. A further step 918 includes inserting the support structure insert into the shell cavity of the outer shell. Still a further step 920 includes attaching the support structure to the side wall, the end wall or both of the outer shell.

While the subject novel concept has been described with reference to the foregoing embodiments and considerable emphasis has been placed herein on the structures and structural interrelationships between the component parts of the embodiments disclosed, it will be appreciated that other embodiments can be made and that many changes can be made in the embodiments illustrated and described without departing from the principles of the subject novel concept. Obviously, modifications and alterations will occur to others upon reading and understanding the preceding detailed description. Accordingly, it is to be distinctly understood that the foregoing descriptive matter is to be interpreted merely as illustrative of the present novel concept and not as a limitation. As such, it is intended that the subject novel concept be construed as including all such modifications and alterations insofar as they come within the scope of the appended claims and any equivalents thereof.

The invention claimed is:

1. An air spring piston assembly comprising:
    an outer shell having a longitudinally extending axis and including a shell wall extending circumferentially about said axis and at least partially defining a shell cavity having an open end, said shell wall including a end wall portion disposed opposite said open end and extending generally transverse to said axis, and said shell wall including a side wall portion extending generally longitudinally from along said end wall portion, said end wall portion including a plurality of clip-receiving openings disposed about said axis; and,
    a structural insert extending longitudinally between opposing first and second ends, said structural insert including a support column, a plurality of support walls extending outwardly from said support column and a plurality of retaining clips projecting from said first end of said structural insert, said plurality of retaining clips including a fixed end connected along said first end of said structural insert and a free end dispose opposite said fixed end, said free end of said plurality of retaining clips including a projection extending generally transverse to said axis for engaging said end wall portion of said oar shell;
    said structural insert received at least partially within said shell cavity such that (1) said support column is disposed in abutting engagement with said end wall portion of said outer shell, (2) said plurality of support walls are disposed in abutting engagement with said side wall portion of said outer shell, and (3) said free ends of said plurality of retaining clips extend through respective ones of said plurality of clip-receiving openings in said end wall portion such that said projections can abuttingly engage said oar shell and thereby removably secure said oar shell and said structural insert to one another.

2. An air spring assembly according to claim 1, wherein said plurality of support walls Includes at least four support walls.

3. An air spring assembly for an associated vehicle suspension having spaced first and second structural members, said air spring assembly comprising:
    a first end member adapted to engaging the first structural member;
    a first securement member operatively associated with said first end member for securing said first end member along the first structural member;
    a piston assembly disposed in longitudinally-spaced relation to said first end member and adapted to engage the second structural member, said piston assembly including an outer shell and a structural insert, said outer shell including a longitudinal axis and including a shell wall extending circumferentially about said axis, said shell wall being integrally formed of thin-walled material having a substantially uniform cross-sectional thickness and including a side wall portion and an end wall portion, said side wall portion and said end wall portion at least partially forming a shell cavity having an open end opposite said end wall portion, said end wall portion including a plurality of openings disposed about said axis, said structural insert received at least partially within said shell cavity and including a first insert end wall disposed in abutting engagement with said end wall portion of said shell wall, a second insert end wall disposed toward said open end of said outer shell, a plurality of support walls extending outwardly toward said shell side wall and a plurality of retaining clips projecting from said first insert end wall and received in respective ones of said plurality of openings to thereby removably secure said outer shell and said structural insert together;
    a second securement member operatively associate with said piston assembly for securing said piston assembly along the second structural member; and,
    a flexible sleeve secured between said first end member and said piston assembly, and at least partially forming a spring chamber therebetween.

4. An air spring assembly according to claim 3, wherein said structural insert includes a central support wall extending between said first and second insert walls and forming a passage extending centrally through said structural insert with said plurality of support walls extending outwardly from along said central support wall.

5. An air spring assembly according to claim 4, wherein said central support wall and said plurality of support walls include a stiffening rib formed therealong and extending approximately transverse to said axis.

6. An air spring piston assembly according to claim 1, wherein said plurality of support walls of said structural insert each include a stiffening rib extending generally transverse to said axis.

7. An air spring piston assembly according to claim 1, wherein said structural insert includes a boss extending between adjacent ones of said plurality of support walls.

8. An air spring assembly according to claim 3, wherein said plurality of support walls includes at least four support walls, and said support structure insert includes a first boss extending between two adjacent ones of said at least four support walls and includes a second boss extending between two different adjacent ones of said at least four support walls, said first and second bosses each including a securement feature thereon for receiving a second securement member for securing said piston assembly along the second structural member.

9. An air spring assembly according to claim 4, wherein said end wall portion of said shell wall includes a fastener-receiving opening disposed in approximate alignment with said passage extending centrally through said structural insert, and said air spring assembly further comprises a third securement member operatively connecting said flexible sleeve to said shell wall with said third securement member being accessible from along said passage extending centrally through said structural insert.

10. A method of manufacturing an air spring piston assembly, said method comprising:
 a) forming an outer shell having a uniformly thin-walled cross-sectional thickness that includes a side wall portion and an end wall portion that together at least partially define a shell cavity having an open end, said end wall portion including a plurality of clip-receiving openings formed therealong;
 b) forming a structural insert that includes a central support section, an outer wall section that extends outwardly from said central support section and a plurality of attachment clips extending from at least one of said central support section and said outer wall section with each of said plurality of attachment clips including a fixed end and a free end; and,
 c) inserting said structural insert at least partially into said shell cavity and deflecting said free ends such that said plurality of attachment clips extend through respective ones of said plurality of clip-receiving openings and thereby secure said structural insert to said outer shell.

11. A method according to claim 10, wherein b) includes forming said structural insert from a plastic material using at least in part one of a molding process and an extrusion process.

12. A method of manufacturing an air spring piston assembly, said method comprising:
 a) forming an outer shell having a uniformly thin-walled cross-sectional thickness that includes a side wall portion and an end wall portion that together at least partially define a shell cavity having an open end, said end wall portion including a plurality of clip-receiving openings formed therealong;
 b) forming a structural insert that includes a central support section, an outer wall section that extends outwardly from said central support section and a plurality of attachment clips that extend from at least one of said central support section and said outer wall section, said outer wall including a plurality of support walls extending radially outwardly from said central support section, said plurality of support walls including outer ends; and,
 c) inserting said structural insert at least partially into said shell cavity such that said outer ends of said plurality of support walls abuttingly engage said side wall portion of said outer shell and said plurality of attachment clips extend through respective ones of said plurality of clip-receiving openings and thereby secure said structural insert to said outer shell.

13. A method of manufacturing an air spring assembly comprising:
 a) providing a first end member;
 b) assembling a piston assembly that includes an outer shell and an inner support structure, said outer shell being formed from a substantially uniform, thin-walled material and including a shell side wall and a shell end wall at least partially defining a shell cavity having an open end opposite said shell end wall, said shell end wall including a plurality of clip-receiving openings disposed therealong, said inner support structure including a central support portion, a plurality of support walls extending outwardly from said central support portion and engaging said shell side wall, and a plurality of retaining clips projecting from along at least one of said central support portion and said plurality of support walls, said plurality of retaining clips extending through respective ones of said plurality of clip-receiving openings to removably secure said outer shell and said inner support structure together, said central support portion including a passage extending therethrough, and said shell end wall including a central opening in approximate alignment with said passage;
 c) providing a flexible sleeve having opposing first and second ends;
 d) securing said first end of said flexible sleeve on said first end member; and,
 e) securing said second end of said flexible sleeve on said piston assembly, said securing action including connecting a securement fastener between said second end of said flexible sleeve and said outer shell.

14. A method according to claim 13, wherein b) includes inserting said inner support structure into said shell cavity and securing said inner support structure and said outer shell to at least one another.

15. A method of manufacturing an air spring assembly comprising:
 a) providing a first end member;
 b) assembling a piston assembly by:
  b1) providing an outer shell formed from a substantially uniform, thin-walled material and including a shell side wall and a shell end wall at least partially defining a shell cavity having an open end opposite said shell end wall, said shell end wall including a plurality of clip-receiving openings disposed therealong;
  b2) providing an inner support structure that includes a central support portion, a plurality of support walls extending outwardly from said central support portion and adapted to engage said shell side wall, and a plurality of retaining clips projecting from along at least one of said central support portion and said plurality of support walls, each of said plurality of retaining clips includes including a fixed end and a free end, and inserting said inner support structure in c)
  b3) inserting said inner support structure into said shell cavity of said outer shell to form said piston assembly, said inserting action including deflecting said free ends to extend said plurality of retaining clips into respective ones of said plurality of clip-receiving openings such that said plurality of retaining clips extend through respective ones of said plurality of clip-receiving openings to removably secure said outer shell and said inner support structure together;

c) providing a flexible sleeve having opposing first and second ends;

d) securing said first end of said flexible sleeve on said first end member; and, e) securing said second end of said flexible sleeve on said piston assembly.

* * * * *